United States Patent
Chu et al.

(10) Patent No.: US 11,082,888 B2
(45) Date of Patent: Aug. 3, 2021

(54) SINGLE ACKNOWLEDGMENT POLICY FOR AGGREGATE MPDU

(71) Applicant: NXP USA, Inc., Austin, TX (US)

(72) Inventors: Liwen Chu, San Ramon, CA (US);
Hongyuan Zhang, Fremont, CA (US);
Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/044,234

(22) Filed: Jul. 24, 2018

(65) Prior Publication Data
US 2018/0332502 A1    Nov. 15, 2018

Related U.S. Application Data

(63) Continuation-in-part of application No. 15/299,325, filed on Oct. 20, 2016, now Pat. No. 10,278,224.
(Continued)

(51) Int. Cl.
*H04W 28/06*    (2009.01)
*H04L 1/16*    (2006.01)
(Continued)

(52) U.S. Cl.
CPC .......... *H04W 28/06* (2013.01); *H04L 1/1614* (2013.01); *H04L 1/1671* (2013.01); *H04L 69/22* (2013.01);
(Continued)

(58) Field of Classification Search
CPC ..... H04W 28/06; H04W 28/04; H04W 84/12; H04L 1/1671; H04L 69/22; H04L 69/324; H04L 1/1614
See application file for complete search history.

(56) References Cited

U.S. PATENT DOCUMENTS

| 7,599,332 B2 | 10/2009 | Zelst et al. |
| 7,688,176 B2 | 3/2010 | Jang et al. |

(Continued)

FOREIGN PATENT DOCUMENTS

| WO | WO-2012/162576 | 11/2012 |
| WO | WO-2015/077547 | 5/2015 |
| WO | WO-2015/077547 A1 | 5/2015 |

OTHER PUBLICATIONS

Office Action in U.S. Appl. No. 16/397,647, dated Oct. 1, 2019 (21 pages).
(Continued)

*Primary Examiner* — Un C Cho
*Assistant Examiner* — Lalita W Pace

(57) ABSTRACT

A method for communicating an acknowledgment policy for a data unit in a wireless local area network is described. A plurality of medium access control (MAC) protocol data units (MPDUs) of an aggregate MPDU intended for a second communication device are generated. A plurality of MPDU delimiters are generated, each MPDU delimiter of the plurality of MPDU delimiters indicating an acknowledgment policy for a corresponding MPDU of the plurality of MPDUs. At least two MPDUs of the plurality of MPDUs correspond to MPDU delimiters that indicate an acknowledgment policy corresponding to a single acknowledgment frame for the corresponding MPDUs. The aggregate MPDU is generated to include the plurality of MPDUs and the plurality of MPDU delimiters. The aggregate MPDU is caused to be transmitted from the first communication device to the second communication device.

25 Claims, 24 Drawing Sheets

Related U.S. Application Data

(60) Provisional application No. 62/560,495, filed on Sep. 19, 2017, provisional application No. 62/536,380, filed on Jul. 24, 2017, provisional application No. 62/304,570, filed on Mar. 7, 2016, provisional application No. 62/297,236, filed on Feb. 19, 2016, provisional application No. 62/252,732, filed on Nov. 9, 2015, provisional application No. 62/243,769, filed on Oct. 20, 2015.

(51) Int. Cl.
    *H04W 28/04*     (2009.01)
    *H04L 29/08*     (2006.01)
    *H04L 29/06*     (2006.01)
    *H04W 84/12*     (2009.01)

(52) U.S. Cl.
    CPC ........... *H04L 69/324* (2013.01); *H04W 28/04* (2013.01); *H04W 84/12* (2013.01)

(56) References Cited

U.S. PATENT DOCUMENTS

| | | | |
|---|---|---|---|
| 7,742,390 B2 | 6/2010 | Mujtaba | |
| 8,155,138 B2 | 4/2012 | van Nee | |
| 8,289,869 B2 | 10/2012 | Sawai | |
| 8,526,351 B2 | 9/2013 | Fischer et al. | |
| 8,571,010 B1 | 10/2013 | Zhang et al. | |
| 8,619,907 B2 | 12/2013 | Mujtaba et al. | |
| 8,724,720 B2 | 5/2014 | Srinivasa et al. | |
| 9,166,660 B2 | 10/2015 | Chu et al. | |
| 9,197,298 B2 | 11/2015 | Kim et al. | |
| 9,729,214 B2 | 8/2017 | Chu et al. | |
| 9,781,719 B2 | 10/2017 | Hasegawa et al. | |
| 9,900,871 B1* | 2/2018 | Ryu ....................... | H04L 5/0055 |
| 10,277,376 B2 | 4/2019 | Chu et al. | |
| 10,278,172 B2 | 4/2019 | Chun et al. | |
| 10,502,810 B1 | 12/2019 | Ahirwar et al. | |
| 2005/0265302 A1 | 12/2005 | Nishibayashi et al. | |
| 2005/0270978 A1 | 12/2005 | Haines | |
| 2006/0248429 A1* | 11/2006 | Grandhi ................ | H04L 1/1671 714/749 |
| 2007/0086374 A1 | 4/2007 | Jang et al. | |
| 2007/0186134 A1 | 8/2007 | Singh et al. | |
| 2008/0112350 A1 | 5/2008 | Nanda et al. | |
| 2008/0212612 A1 | 9/2008 | Singh et al. | |
| 2009/0063804 A1 | 3/2009 | Trainin | |
| 2009/0067396 A1 | 3/2009 | Fischer | |
| 2009/0092110 A1 | 4/2009 | Taki et al. | |
| 2009/0196163 A1 | 8/2009 | Du | |
| 2009/0268709 A1 | 10/2009 | Yu | |
| 2010/0220678 A1 | 9/2010 | Wentink | |
| 2010/0329236 A1 | 12/2010 | Sampath et al. | |
| 2011/0002219 A1 | 1/2011 | Kim et al. | |
| 2011/0090855 A1 | 4/2011 | Kim | |
| 2011/0235593 A1 | 9/2011 | Gong et al. | |
| 2011/0261708 A1 | 10/2011 | Grandhi | |
| 2011/0286377 A1 | 11/2011 | Sampath et al. | |
| 2012/0163354 A1 | 6/2012 | Stacey et al. | |
| 2012/0213308 A1* | 8/2012 | Merlin ................... | H04L 1/1621 375/295 |
| 2012/0314697 A1 | 12/2012 | Noh et al. | |
| 2013/0223345 A1 | 8/2013 | Asterjadhi et al. | |
| 2013/0229996 A1 | 9/2013 | Wang et al. | |
| 2013/0230059 A1 | 9/2013 | Quan et al. | |
| 2013/0301569 A1* | 11/2013 | Wang ..................... | H04L 1/1671 370/329 |
| 2015/0063190 A1 | 3/2015 | Merlin et al. | |
| 2015/0092652 A1 | 4/2015 | Ramamurthy et al. | |
| 2015/0103767 A1 | 4/2015 | Kim et al. | |
| 2015/0131517 A1 | 5/2015 | Chu et al. | |
| 2015/0146654 A1 | 5/2015 | Chu et al. | |
| 2015/0146699 A1 | 5/2015 | Wentink et al. | |
| 2015/0288501 A1 | 10/2015 | Kwon et al. | |
| 2015/0365940 A1 | 12/2015 | Chu et al. | |
| 2016/0028452 A1 | 1/2016 | Chu et al. | |
| 2016/0029373 A1 | 1/2016 | Seok | |
| 2016/0043946 A1 | 2/2016 | Merlin et al. | |
| 2016/0087775 A1* | 3/2016 | Hedayat .................... | H04L 1/12 370/329 |
| 2016/0127233 A1 | 5/2016 | Wentink et al. | |
| 2016/0182205 A1 | 6/2016 | Asterjadhi et al. | |
| 2016/0183253 A1* | 6/2016 | Merlin ................... | H04L 1/0042 370/329 |
| 2016/0323879 A1 | 11/2016 | Ghosh et al. | |
| 2016/0360509 A1* | 12/2016 | Seok ....................... | H04L 45/74 |
| 2017/0055300 A1 | 2/2017 | Pitchaiah | |
| 2017/0078003 A1 | 3/2017 | Ghosh et al. | |
| 2017/0093547 A1 | 3/2017 | Merlin et al. | |
| 2017/0111951 A1 | 4/2017 | Chu et al. | |
| 2017/0188390 A1 | 6/2017 | Adachi et al. | |
| 2017/0202026 A1 | 7/2017 | Ahn et al. | |
| 2017/0279864 A1 | 9/2017 | Chun et al. | |
| 2017/0310446 A1* | 10/2017 | Asterjadhi ............ | H04L 1/1614 |
| 2017/0359152 A1 | 12/2017 | Li et al. | |
| 2018/0145801 A1 | 5/2018 | Wang et al. | |
| 2018/0242355 A1* | 8/2018 | Lou ..................... | H04W 72/121 |
| 2018/0332540 A1* | 11/2018 | Lou ....................... | H04W 52/10 |
| 2018/0338325 A1* | 11/2018 | Ryu ..................... | H04W 74/085 |
| 2019/0254099 A1 | 8/2019 | Chu et al. | |
| 2019/0273768 A1 | 9/2019 | Chun et al. | |
| 2019/0289495 A1 | 9/2019 | Chu et al. | |

OTHER PUBLICATIONS

Stacey, "Resolution for CIDs 1118, 1119, 1122, Frame Body Size," IEEE 802.11-11 /0396r2, 4 pages (Mar. 15, 2011).

Invitation to Pay Additional Fees and Partial International Search Report in International Patent Application No. PCT/US2017/018761, dated Jun. 7, 2017 (22 pages).

Seok et al., "HEW PPDU Format for Supporting MIMO-OFDMA," IEEE 802.11-14/1210r0, 16 pages, (Sep. 14, 2014).

Merlin et al., "Trigger Frame Format," IEEE Draft, doc. IEEE 802.11-15/0877r1, vol. 802.11ax, No. 1, 16 pages (Jul. 13, 2015).

Office Action in U.S. Appl. No. 16/397,647, dated Jan. 31, 2020 (14 pages).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11ac/D5.0 "Draft Standard for Information Technology—Telecommunications and information exchange between systems—Local and metropolitan area networks—Specific requirements, Part

(56) References Cited

OTHER PUBLICATIONS

11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE Std 802.16-2004 (Revision of IEEE Std 802.16-2001), "IEEE Standard for Local and metropolitan area networks; Part 16: Air Interface for Fixed Broadband Wireless Access Systems," The Institute of Electrical and Electronics Engineers, Inc., 893 pages (Oct. 1, 2004).
IEEE P802.16Rev2/D5 (Jul. 2008) (Revision of IEEE Std 802.16-2004 and consolidates material from IEEE Std 802.16e-2005, Std 802.16-2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).
IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," The Institute of Electrical and Electronics Engineers, Inc., pp. 1-292 (Apr. 1, 2003).
IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, The Institute of Electrical and Electronics Engineers, Inc., pp. 1-864 (Feb. 28, 2006).
IEEE Std 802.16j (Amendment to IEEE Std 802.16-2009), "IEEE Standard for Local and metropolitan area networks: Part 16: Air Interface for Broadband Wireless Access Systems—Amendment 1: Multihop Relay Specification," The Institute of Electrical and Electronics Engineers, Inc., pp. 1-315 (Jun. 12, 2009).
IEEE Std 802.161™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).
IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4 Enhancements for Higher Throughput," The Institute of Electrical and Electronics Engineers, Inc., pp. 1-544 (Sep. 2007).
IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma/D7.0), pp. 1-1212 (2006).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).
IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).
IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).
IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).
IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).
IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical

(56) References Cited

OTHER PUBLICATIONS

Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, "*The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std 802.16-2009 (Revision of IEEE Std. 802.16-2004), IEEE Standard for Local and metropolitan area networks: Part 16: Air Interface for Broadband Wireless Access Systems, The Institute of Electrical and Electronics Engineers, Inc., 2082 pages (May 29, 2009).

IEEE 802.20-PD-06; IEEE P 802.20™V14, Draft 802.20 Permanent Document; <System Requirements for IEEE 802.20 Mobile Broadband Wireless Access Systems—Version 14>, 24 pages (Jul. 16, 2004).

ITU-T Recommendation G.9960, "Unified high-speed wireline-based home networking transceivers—System architecture and physical layer specification," *Int'l Telecommunication Union*, pp. 1-160 (Dec. 2011).

ITU-T Recommendation G.9960, Erratum 1 to Recommendation ITU-T G.9960, *Int'l Telecommunication Union*, 1 page (Jul. 2012).

ITU-T Recommendation G.9960, Erratum 2 to Recommendation ITU-T G.9960, *Int'l Telecommunication Union*, 4 pages (Sep. 2012).

ITU-T Recommendation G.9961, "Unified high-speed wire-line based home networking transceivers—Data link layer specification," *Int'l Telecommunication Union*, pp. 1-220 (Jun. 2010).

ITU-T Recommendation G.9961, Amendment 1, "Unified high-speed wire-line based home networking transceivers—Data link layer specification," *Int'l Telecommunication Union*, pp. 1-80 (Sep. 2012).

ITU-T Recommendation G.9961, Amendment 2, "Unified high-speed wire-line based home networking transceivers—Data link layer specification," *Int'l Telecommunication Union*, pp. 1-44 (Apr. 2014).

ITU-T Recommendation G.9961, Corrigendum 1, "Unified high-speed wire-line based home networking transceivers—Data link layer specification," *Int'l Telecommunication Union*, pp. 1-158 (Dec. 2011).

ITU-T Recommendation G.9961, Corrigendum 2, "Unified high-speed wire-line based home networking transceivers—Data link layer specification," *Int'l Telecommunication Union*, pp. 1-122 (Jul. 2013).

ITU-T Recommendation G.9963, "Unified high-speed wireline-based home networking transceivers—Multiple input-multiple output specification" *Int'l Telecommunication Union*, pp. 1-90 (Dec. 2011).

Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

"The Authoritative Dictionary of IEEE Standards Terms," IEEE 100 Seventh Edition, pp. 10 and 90, Dec. 11, 2000.

Boyd et al., "Convex Optimization," *Cambridge University Press*, pp. 1-728 (2004).

Brown, "G.hn: Draft text for G.9960 (2010) corrigendum 1," *International Telecommunication Union*, pp. 1-184 (Feb. 2011).

Brown, "G.hn: Draft text for G.9961 (2010) corrigendum 1," *International Telecommunication Union*, pp. 1-282 (Feb. 2011).

Chen, "Home Network Basis: Transmission Environments and Wired/Wireless Protocols," Prentice Hall, pp. 1-26 (Jul. 2003).

Chun et al. "Legacy Support on HEW frame structure," doc: IEEE 11-13/1057r0, *The Institute of Electrical and Electronics Engineers, Inc.*, pp. 1-8 (Sep. 2013).

Clausen, "Branch and Bound Algorithms—Principles and Examples," Department of Computer Science, University of Copenhagen, pp. 1-30 (Mar. 12, 1999).

Hazen, "OFDM or OFDMA?," Mobile Dev Design, 3 pages (Oct. 25, 2005); available at http://mobiledevdesign.com/learning-resources/ofdm-or-ofdma, last accessed Nov. 15, 2016.

Hiertz et al., "The IEEE 802.11 Universe," IEEE Communications Magazine, pp. 62-70, (Jan. 2010).

Land et al., "An Automatic Method of Solving Discrete Programming Problems," Econometrica, vol. 28, No. 3, pp. 497-520 (Jul. 1960).

Lin et al., "Optimal and Near-Optimal Resource allocation Algorithms for OFDMA Networks," IEEE Transactions on Wireless Communications, vol. 8, No. 8, pp. 4066-4077 (Aug. 2009).

Maha et al., "Multi-User MIMO Communication: Basic Aspects, Benefits and Challenges," Intech, 22 pages (2013).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Van Nee et al. "The 802.11n MIMO-OFDM Standard for Wireless LAN and Beyond," Wireless Personal Communications, vol. 37, pp. 445-453 (Jun. 2006).

Kim et al., "A High-Throughput MAC Strategy for Next-Generation WLANs," Sixth IEEE International Symposium on a World of Wireless Movile and Multimedia Networks (WoWMoM'05), pp. 278-285 (Jun. 2005).

International Search Report and Written Opinion in International Patent Application No. PCT/US2016/057978, dated Feb. 7, 2017 (16 pages).

International Preliminary Report on Patentability in International Patent Application No. PCT/US2016/057978, dated May 3, 2018 (11 pages).

U.S. Appl. No. 16/039,248, Chu et al., "Acknowledgement of Transmissions in a Wireless Local Area Network," filed Jul. 18, 2018.

Non-final office action dated Feb. 1, 2016 in U.S. Appl. No. 14/808,932.

Non-final office action dated Jul. 20, 2016 in U.S. Appl. No. 14/608,932.

Non-final office action dated Dec. 7, 2016 in U.S. Appl. No. 14/808,932.

Notice of Allowance dated Oct. 21, 2019 in U.S. Appl. No. 16/397,722.

Notice of Allowance dated Apr. 10, 2020 in U.S. Appl. No. 16/397,647.

Notice of Allowance dated Apr. 13, 2020 in U.S. Appl. No. 16/430,034.

Notice of Allowance in U.S. Appl. No. 16/039,248 dated Jan. 18, 2019 (36 pages).

Notice of Allowance in U.S. Appl. No. 15/438,578 dated Mar. 7, 2019.

(56) References Cited

OTHER PUBLICATIONS

Asterjadhi, A. (Qualcomm Inc), "BlockAck generation and selection rules", IEEE Draft; 11-16-0616-02-00AX-Blockack-Generation-and-Selection-Rules, IEEE-SA Mentor, Piscataway, NJ USA, vol. 802.11ax, No. 2, pp. 1-29, May 17, 2016 (May 17, 2016).

Cherian, G., "CRs for Section 27.4", IEEE Draft; 11-17-0319-01-00AX-CRS-For-Section-27-4, IEEE-SA Mentor, Piscataway, NJ USA, vol. 802.11ax, No. 1, Mar. 15, 2017 (Mar. 15, 2017), pp. 1-20.

IEEE P802.11 ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11 ax™/D2.2, "Draft Standard for information technology—Telecommunications and information exchange between systems Local and metropolitan area networks—Specific Requirements, Part 11: Wireless LAN Medium Access Control (MAC) and Physical Layer (Phy) Specifications, Amendment 6: Enhancements for High Efficiency WLAN," IEEE Computer Society, 620 pages (Feb. 2018).

Notice of Allowance dated Jul. 22, 2020 in U.S. Appl. No. 16/397,647.

Notice of Allowance dated Jul. 24, 2020 in U.S. Appl. No. 16/430,034.

* cited by examiner

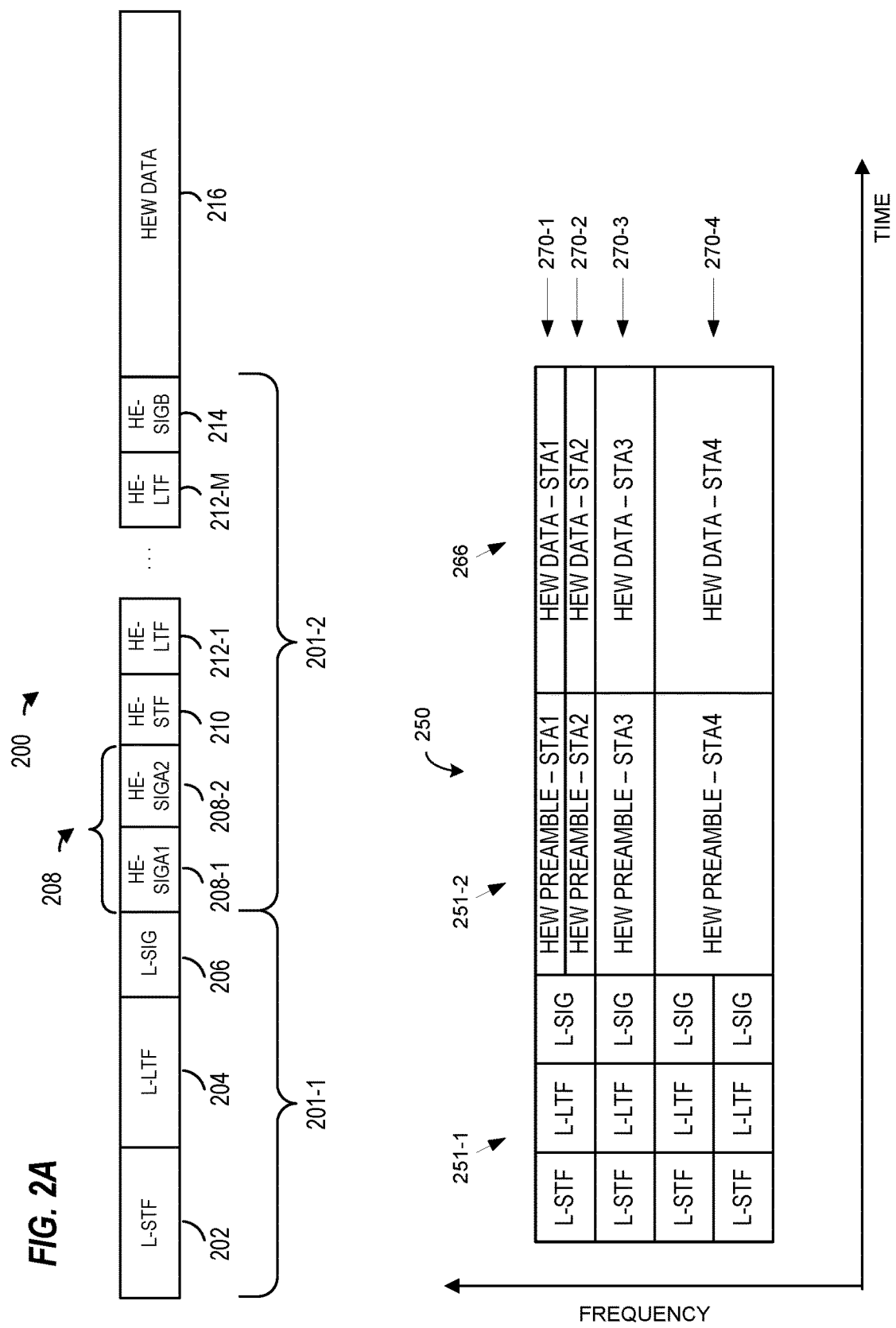

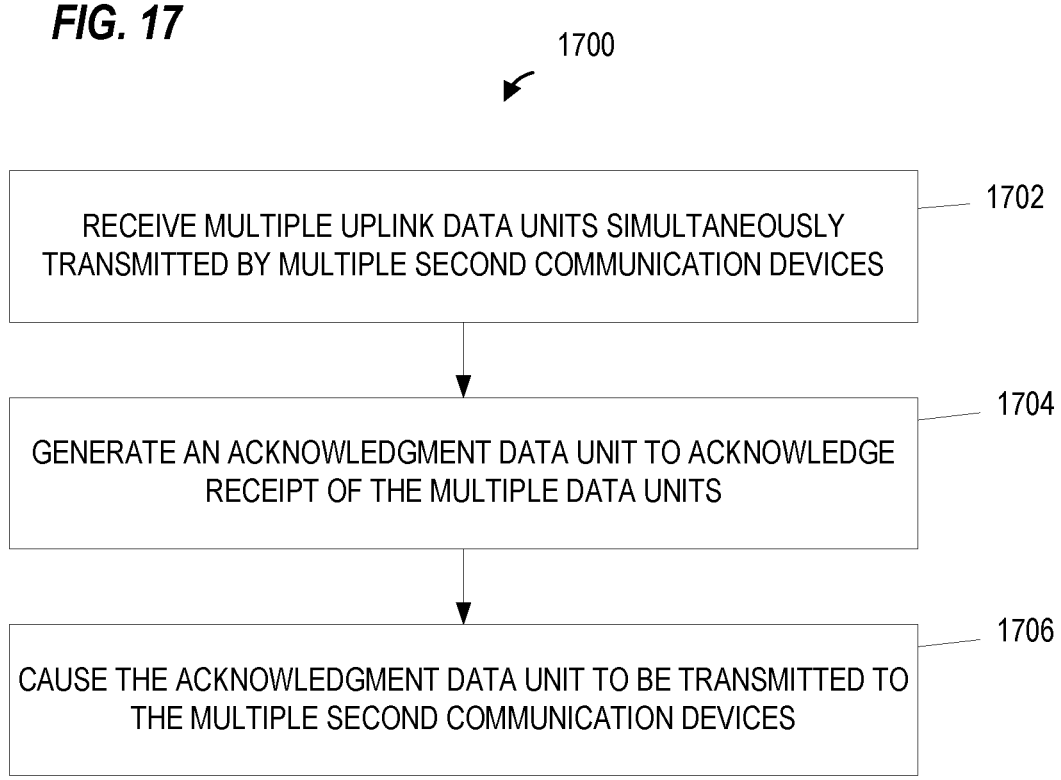

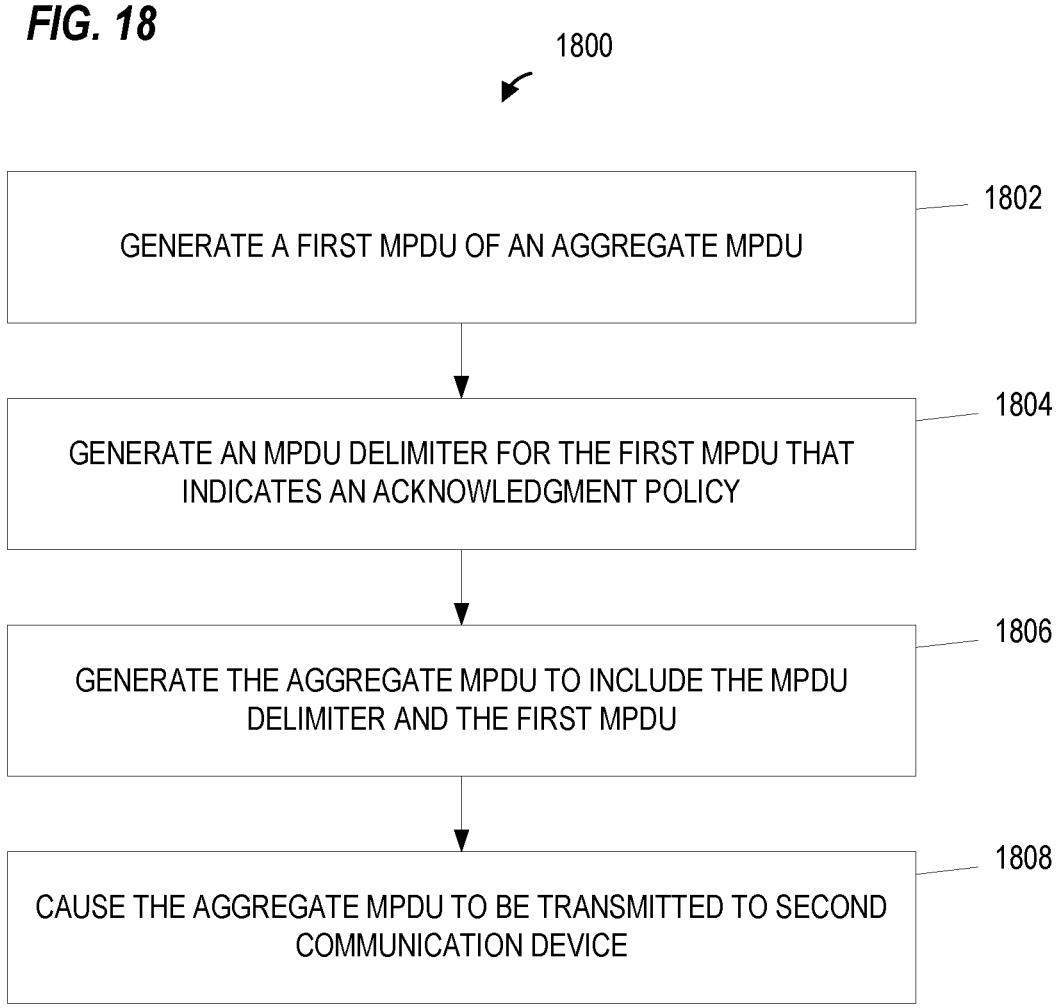

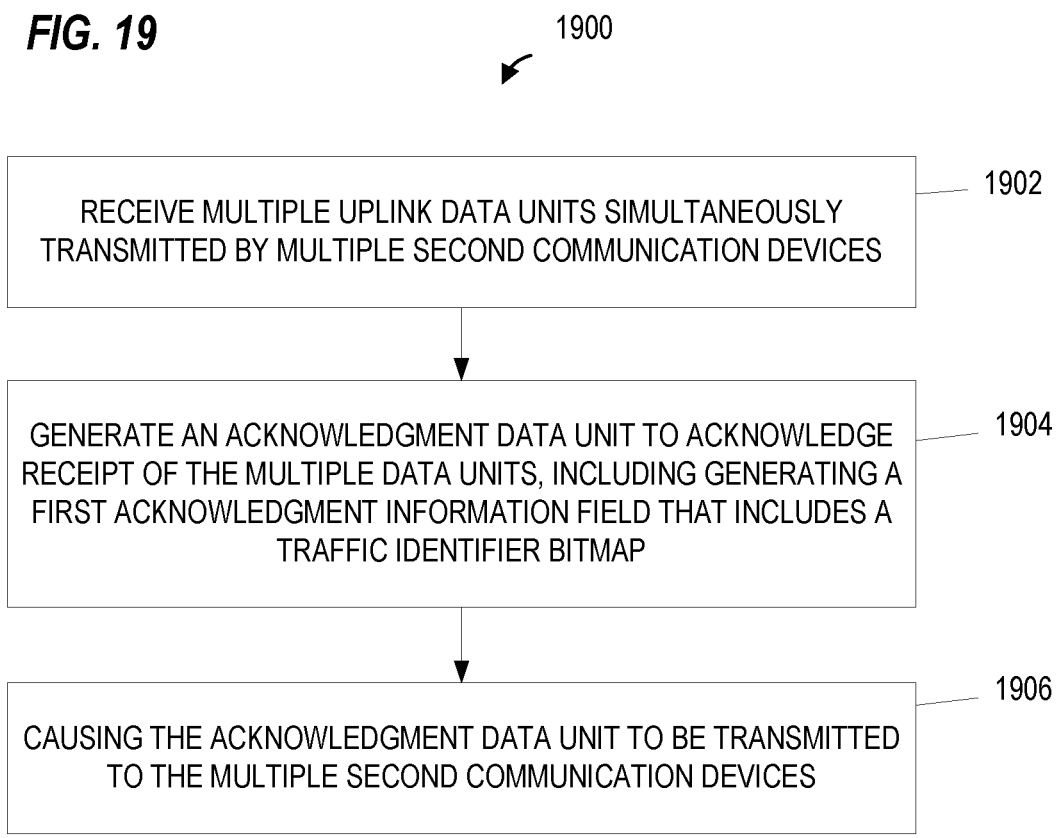

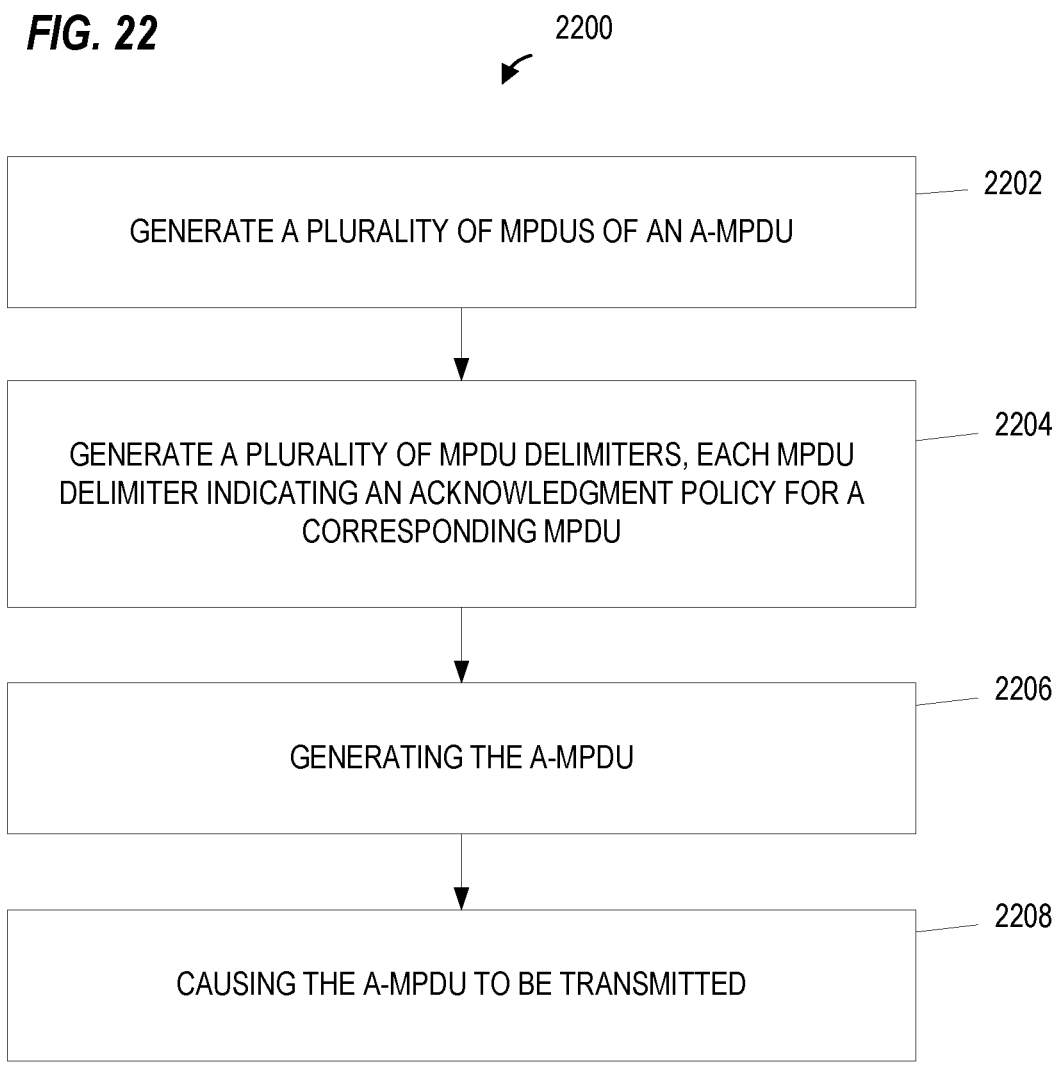

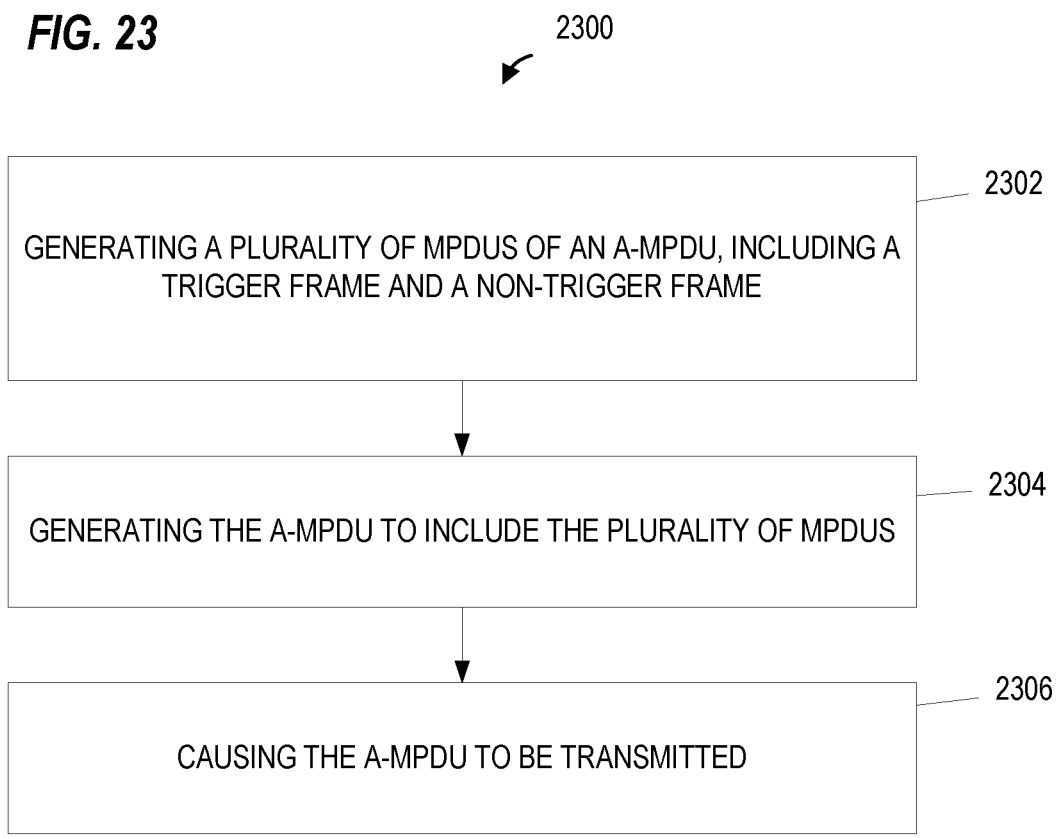

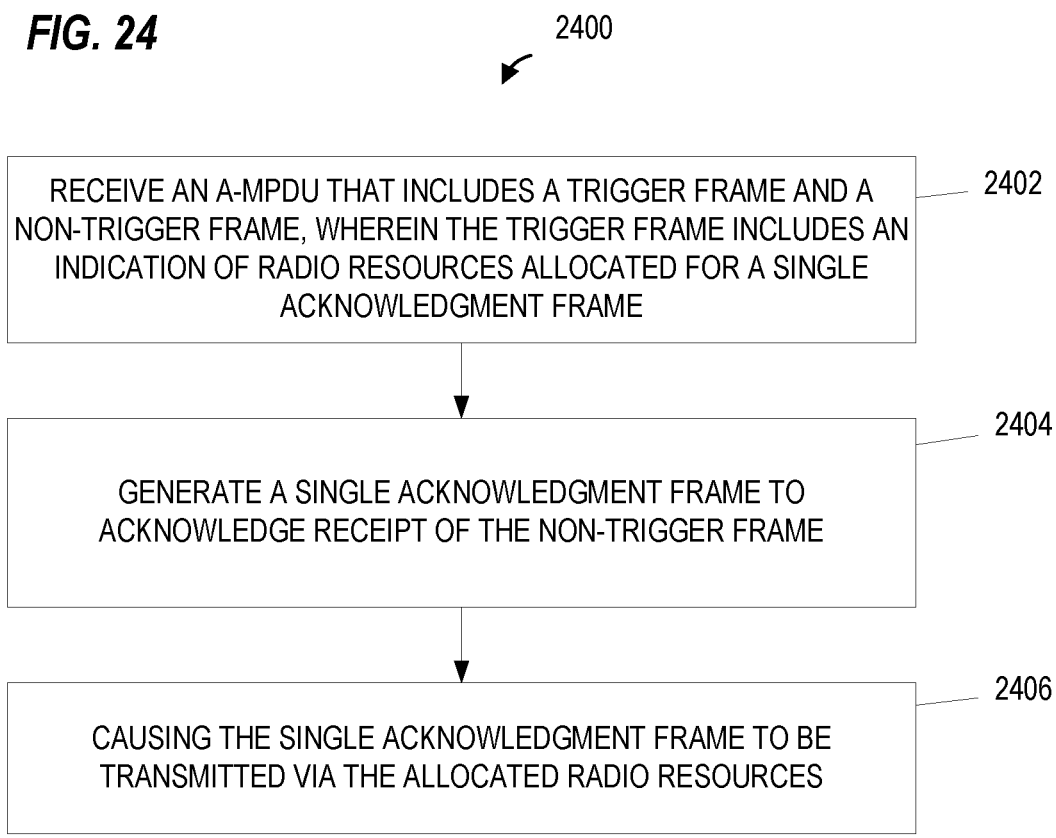

SINGLE ACKNOWLEDGMENT POLICY FOR AGGREGATE MPDU

CROSS-REFERENCES TO RELATED APPLICATIONS

This application is a continuation-in-part of U.S. patent application Ser. No. 15/299,325, entitled "Acknowledgment Data Unit for Multiple Uplink Data Units," filed on Oct. 20, 2016, which claims the benefit of U.S. Provisional Patent Application No. 62/243,769, entitled "Acknowledgment of OFDMA A-MPDU with Multiple TCs," filed on Oct. 20, 2015, U.S. Provisional Patent Application No. 62/252,732, entitled "Acknowledgment of OFDMA A-MPDU with Multiple TCs," filed on Nov. 9, 2015, U.S. Provisional Patent Application No. 62/297,236, entitled "Acknowledgment of OFDMA A-MPDU with Multiple TCs," filed on Feb. 19, 2016, and U.S. Provisional Patent Application No. 62/304,570, entitled "Acknowledgment of OFDMA A-MPDU with Multiple TCs," filed on Mar. 7, 2016, the disclosures of each of which are incorporated herein by reference in their entireties.

Additionally, this application claims the benefit of U.S. Provisional Patent Application No. 62/536,380, entitled "Acknowledgment Data Unit for Multiple Uplink Data Units," filed on Jul. 24, 2017, and U.S. Provisional Patent Application No. 62/560,495, entitled "Acknowledgment Data Unit for Multiple Uplink Data units," filed on Sep. 19, 2017, the disclosures of each of which are incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technologies is described in detail in the IEEE 802.11 Standards, including for example, the IEEE Standards 802.11a/b/g, 802.11n, and 802.11ac and their updates and amendments, as well as the IEEE Standard 802.11ax now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In an embodiment, a method for simultaneously communicating with multiple communication devices in a wireless local area network includes: generating, at a first communication device, a plurality of medium access control (MAC) protocol data units (MPDUs) of an aggregate MPDU intended for a second communication device; generating, at the first communication device, a plurality of MPDU delimiters, each MPDU delimiter of the plurality of MPDU delimiters indicating an acknowledgment policy for a corresponding MPDU of the plurality of MPDUs, wherein at least two MPDUs of the plurality of MPDUs correspond to MPDU delimiters that indicate an acknowledgment policy corresponding to a single acknowledgment frame for the corresponding MPDUs; generating, at the first communication device, the aggregate MPDU to include the plurality of MPDUs and the plurality of MPDU delimiters; and causing the aggregate MPDU to be transmitted from the first communication device to the second communication device.

In another embodiment, a method for communicating an acknowledgment policy for a data unit in a wireless local area network includes: generating, at a first communication device, a plurality of medium access control (MAC) protocol data units (MPDUs) of an aggregate MPDU intended for a second communication device, wherein the plurality of MPDUs include i) a trigger frame, and ii) a non-trigger frame having an acknowledgment policy and corresponding to a single acknowledgment frame, including generating the trigger frame to include an indication of radio resources allocated for the single acknowledgment frame to the non-trigger frame; generating, at the first communication device, the aggregate MPDU to include the plurality of MPDUs; and causing the aggregate MPDU to be transmitted from the first communication device to the second communication device.

In an embodiment, a method for acknowledging data units in a wireless local area network includes: receiving, at a first communication device and from a second communication device, an aggregate medium access control (MAC) protocol data unit (MPDU) A-MPDU that includes multiple data units, wherein the multiple data units include i) a trigger frame, and ii) a non-trigger frame having an acknowledgment policy and corresponding to a single acknowledgment frame, wherein the trigger frame includes an indication of radio resources allocated for the single acknowledgment frame; generating, at the first communication device, the single acknowledgment frame to acknowledge receipt of the non-trigger frame; and causing the single acknowledgment frame to be transmitted from the first communication device to the second communication device via the allocated radio resources.

BRIEF DESCRIPTION OF THE DRAWINGS

FIG. 2A is a diagram of an example orthogonal frequency division multiplexing (OFDM) data unit, according to an embodiment.

FIG. 2B is a diagram of an example orthogonal frequency division multiple access (OFDMA) data unit, according to an embodiment.

FIG. 17 is a flow diagram of an example method for simultaneously communicating with multiple communication devices in a wireless local area network, according to an embodiment.

FIG. 18 is a flow diagram of an example method for communicating an acknowledgment policy for a data unit in a wireless local area network, according to an embodiment.

FIG. 19 is a flow diagram of an example method for simultaneously communicating with multiple communication devices in a wireless local area network, according to an embodiment.

FIG. 22 is a flow diagram of an example method for communicating an acknowledgment policy for a data unit in a wireless local area network, according to an embodiment.

FIG. 23 is a flow diagram of an example method for communicating an acknowledgment policy for a data unit in a wireless local area network, according to an embodiment.

FIG. 24 is a flow diagram of an example method of acknowledging data units in a wireless local area network, according to an embodiment.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. For example, the AP transmits data for the multiple clients in different orthogonal frequency division multiplexing (OFDM) sub-channels of an orthogonal frequency division multiple access (OFDMA) transmission, in an embodiment. Similarly, multiple client stations transmit data to the AP simultaneously, in particular, each client station transmits data in a different OFDM sub-channel of an OFDMA transmission, in an embodiment. In another embodiment, the AP transmits data for multiple client stations using different spatial streams of a multi-user multiple input multiple output (MU-MIMO) transmission. Similarly, multiple client stations transmit data to the AP simultaneously using different spatial streams within an MU-MIMO transmission to the AP, in an embodiment. In other embodiments, a multi-station block acknowledgment (M-BA) is used to acknowledge an aggregate medium access control protocol data unit (A-MPDU) with multiple traffic classes or an A-MPDU from at least a single traffic class and a management frame which asks for Ack in a single user physical layer protocol data unit (PPDU). For example, a unicast frame includes a multi-TID block acknowledgment for a single station.

In an embodiment, upon receiving simultaneous transmissions from multiple client stations, the AP acknowledges receipt of the simultaneous transmissions by transmitting one or more acknowledgement frames to the client stations. For example, in an embodiment, the AP transmits an OFDMA acknowledgement frame that includes respective acknowledgements intended for different client stations in different OFDM sub-channels, in an embodiment. In another embodiment, the AP transmits an MU-MIMO acknowledgment frame that includes respective acknowledgements intended for different client stations transmitted in different spatial streams. In yet another embodiment, the AP transmits a broadcast acknowledgement frame in a single user (SU) PHY protocol data unit (PPDU) or multi-user (MU) PPDU that is broadcast to the multiple client stations and includes the respective acknowledgements intended for the multiple client stations, or a multicast acknowledgement frame that is multicast to the multiple client stations and includes the respective acknowledgements intended for the multiple client stations. The AP acknowledges receipt of simultaneous transmissions from multiple client stations in other suitable manners, in other embodiments.

Figure 1:
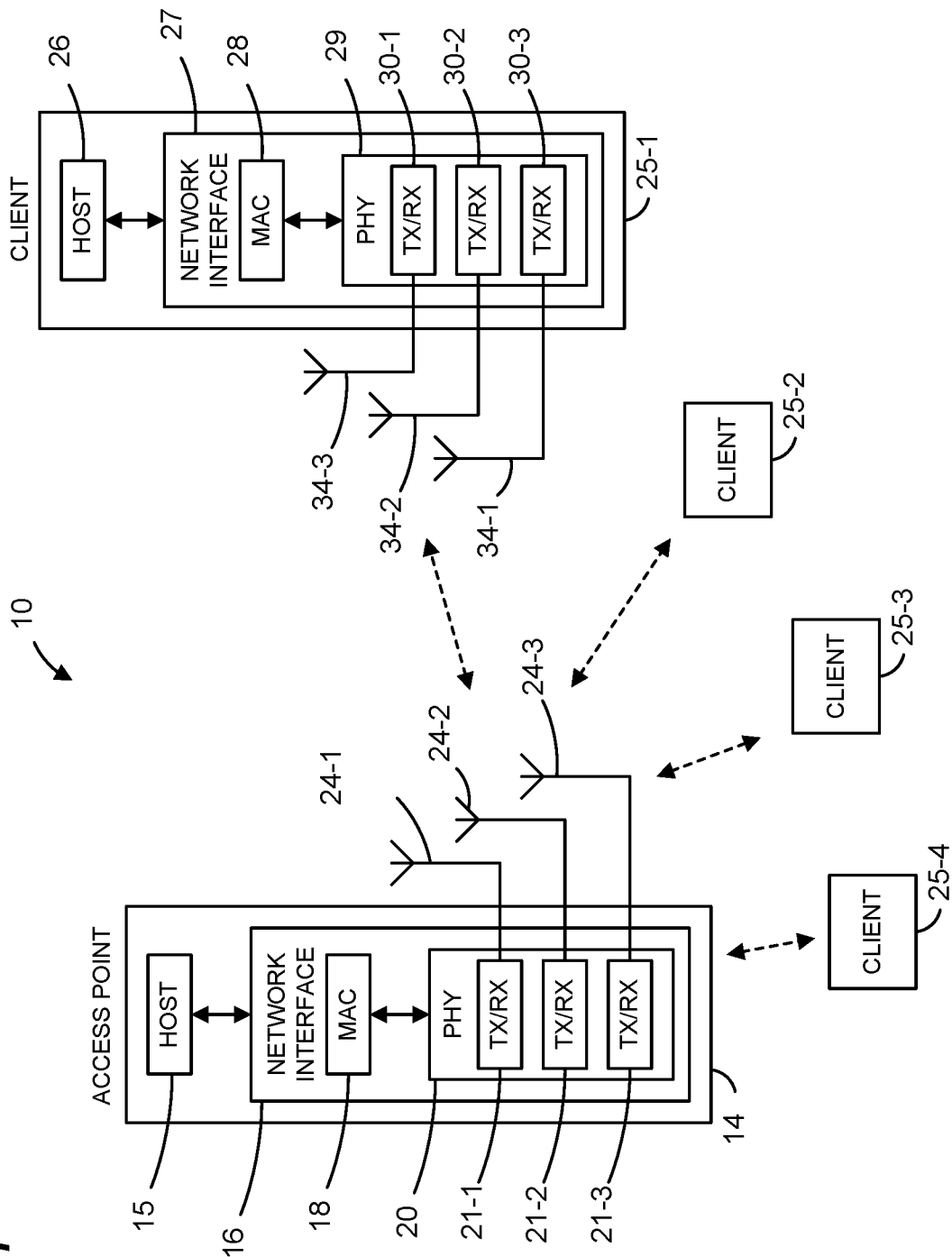
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-3 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client station 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client station 25-1 are configured to process received data units conforming to the first communication protocol and having formats described hereinafter and to determine that such data units conform to the first communication protocol, according to various embodiments.

In various embodiments and/or scenarios, one or both of the AP 14 and the client station 25 are configured to receive multiple uplink data units simultaneously transmitted by multiple second communication devices. The AP 14 or client station 25 generates an acknowledgment data unit to acknowledge receipt of the multiple data units. In some embodiments and/or scenarios, the multiple uplink data units include a management data unit (e.g., an action frame, association request, probe request, probe response, or other suitable management frame) and a traffic data unit (e.g., a data frame, a data+CF-Ack frame, a CF-Poll frame, etc.) In an embodiment, the acknowledgment data unit includes (i) an indication that indicates that the acknowledgment data unit is intended for the multiple second communication devices, and (ii) respective acknowledgment information fields for the multiple second communication devices, where the respective acknowledgment information fields include a first acknowledgment information field for the management data unit and a second acknowledgment information field for the traffic data unit.

FIG. 2A is a diagram of an example orthogonal frequency division multiplexing (OFDM) data unit 200, according to an embodiment. The OFDM data unit 200 is a physical layer data unit, in an embodiment. The AP 14 is configured to transmit the OFDM data unit 200 to the client station 25-1 via OFDM modulation, according to an embodiment. In an embodiment, the client station 25-1 is also configured to transmit the data unit 200 to the AP 14. In some embodiments, the data unit 200 conforms to the first communication protocol and occupies a 20 MHz bandwidth. Data units that conform to the first communication protocol similar to the data unit 200 may occupy other suitable bandwidths such as 2 MHz, 5 MHz, 10 MHz, 40 MHz, 80 MHz, 160 MHz, 320 MHz, 640 MHz, etc., for example, or other suitable bandwidths, in other embodiments. The data unit 200 is suitable for "mixed mode" situations, i.e., when the WLAN 10 includes a client station (e.g., the legacy client station 25-4) that conforms to a legacy communication protocol, but not the first communication protocol. The data unit 200 is utilized in other situations as well, in some embodiments.

In an embodiment, the data unit 200 includes a preamble 201 having an L-STF 202, an L-LTF 204, an L-SIG 206, two first HE signal fields (HE-SIGAs) 208 including a first HE signal field (HE-SIGA1) 208-1 and a second HE signal field (HE-SIGA2) 208-2, a HE short training field (HE-STF) 210, M HE long training fields (HE-LTFs) 212, and a third HE signal field (HE-SIGB) 214. In an embodiment, the preamble 201 includes a legacy portion 201-1, including the L-STF 202, the L-LTF 204, and the L-SIG 206, and a non-legacy portion 201-2, including the HE-SIGAs 208, HE-STF 210, M HE-LTFs 212, and HE-SIGB 214.

Figure 5A:
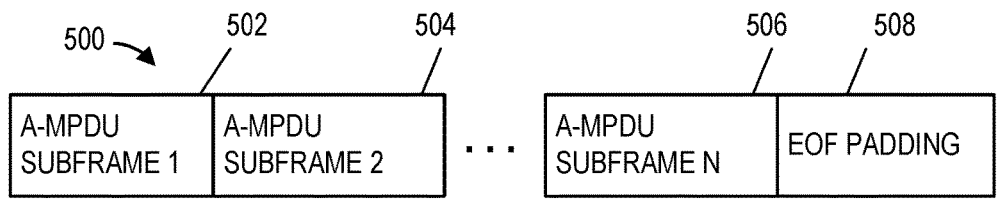
FIG. 5A, FIG. 5B, and FIG. 5C are diagrams of an example A-MPDU, an example A-MPDU subframe, and an example MPDU delimiter, according to an embodiment.

Each of the L-STF 202, the L-LTF 204, the L-SIG 206, the HE-SIGAs 208, the HE-STF 210, the M HE-LTFs 212, and the HE-SIGB 214 are included in an integer number of one or more OFDM symbols. For example, in an embodiment, the HE-SIGAs 208 correspond to two OFDM symbols, where the HE-SIGA1 208-1 field is included in the first OFDM symbol and the HE-SIGA2 is included in the second OFDM symbol. In another embodiment, for example, the preamble 201 includes a third HE signal field (HE-SIGA3, not shown) and the HE-SIGAs 208 correspond to three OFDM symbols, where the HE-SIGA1 208-1 field is included in the first OFDM symbol, the HE-SIGA2 is included in the second OFDM symbol, and the HE-SIGA3 is included in the third OFDM symbol. In at least some examples, the HE-SIGAs 208 are collectively referred to as a single HE signal field (HE-SIGA) 208. In some embodiments, the data unit 200 also includes a data portion 216. In other embodiments, the data unit 200 omits the data portion 216 (e.g., the data unit 200 is a null-data packet). In various embodiments, the data portion 216 includes an A-MPDU or an MPDU, for example, the MPDU 300 (FIG. 3A), the MPDU 350 (FIG. 3B), or the A-MPDU 500 (FIG. 5A).

In the embodiment of FIG. 2A, the data unit 200 includes one of each of the L-STF 202, the L-LTF 204, the L-SIG 206, and the HE-SIGA1$s$ 208. In other embodiments in which an OFDM data unit similar to the data unit 200 occupies a cumulative bandwidth other than 20 MHz, each of the L-STF 202, the L-LTF 204, the L-SIG 206, the HE-SIGA1$s$ 208 is repeated over a corresponding number of 20 MHz-wide sub-bands of the whole bandwidth of the data unit, in an embodiment. For example, in an embodiment, the OFDM data unit occupies an 80 MHz bandwidth and, accordingly, includes four of each of the L-STF 202, the L-LTF 204, the L-SIG 206, and the HE-SIGA1$s$ 208 in four 20 MHz-wide sub-bands that cumulatively span the 80 MHz bandwidth, in an embodiment. In some embodiments, the modulation of different 20 MHz-wide sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz-wide sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

FIG. 2B is a diagram of an example orthogonal frequency division multiple access (OFDMA) data unit 250, according to an embodiment. The OFDMA data unit 250 includes a plurality of OFDM data units 270-1, 270-2, 270-3, and 270-4 having independent data streams corresponding to four client stations 25 (STA1, STA2, STA3, and STA4, respectively). In the illustrated embodiment, the OFDMA data unit 250 occupies an 80 MHz bandwidth. In other embodiments, the OFDMA data unit 250 occupies another suitable bandwidth. In an embodiment, each OFDM data unit 270 is the same as or similar to the OFDM data unit 200 of FIG. 2A.

Each of the OFDM data units 270-1, 270-2, 270-3, and 270-4 conforms to a communication protocol that defines OFDMA communication, such as the HEW communication protocol, in an embodiment. In an embodiment in which the OFDMA data unit 250 corresponds to a downlink OFDMA data unit, the OFDMA data unit 250 is generated by the AP 14 such that each OFDM data unit 270 is transmitted to a respective client station 25 via a respective sub-channel of the WLAN 10 allocated for downlink transmission of the OFDMA data unit 250 to the client station. Similarly, an embodiment in which the OFDMA data unit 250 corresponds to an uplink OFDMA data unit, the AP 14 receives the OFDM data units 270 via respective sub-channels of the WLAN 10 allocated for uplink transmission of the OFDM data units 270 from the client stations, in an embodiment. For example, the OFDM data unit 270-1 is transmitted via a first 10 MHZ sub-channel of the WLAN 10, the OFDM data unit 270-2 is transmitted via a second 10 MHz sub-channel of the WLAN 10, the OFDM data unit 270-3 is transmitted via a 20 MHz sub-channel of the WLAN 10, and the OFDM data unit 270-4 is transmitted via a 40 MHz sub-channel of the WLAN 10, in the illustrated embodiment. In this embodiment, each of the OFDM data units 270-1, 270-2 occupies a respective sub-channel having a bandwidth that is less than a smallest channel of the WLAN 10. For example, the smallest channel of the WLAN 10 is 20 MHz, and each of OFDM data units 270-1, 270-2 occupies a respective sub-channel having a bandwidth of 10 MHz, in an embodiment. The OFDM data units 270-1 and 270-2 collectively span the smallest bandwidth channel of the WLAN 10, in an embodiment.

In an embodiment, each of the OFDM data units 270 includes a legacy preamble 251-1 (e.g., including one or more L-STF fields 202, L-LTF fields 204, and/or L-SIG fields 206) and a non-legacy (e.g., HEW) preamble 251-2 (e.g., including one or more HEW-SIG-A fields 208, HEW-STF fields 210, HEW-LTF fields 212, and/or HEW-SIGB fields 214). Additionally, each OFDM data unit 270 includes a high efficiency WLAN data portion (HEW-DATA) 266. In some embodiments, one or more of the data portions 266 are omitted from the corresponding one or more OFDM data units 270 (e.g., for a null data frame). In an embodiment, the content of each of the non-legacy preambles 251-2 can be variant for different client stations depending on factors such as rate, data quantity, configuration (e.g., number of antennas, number of supported multiple input, multiple output (MIMO) data streams, etc.) of the different client stations.

In an embodiment, each L-STF field, L-LTF field, and L-SIG field of the legacy preamble 251-1 occupies a smallest bandwidth supported by the WLAN 10 (e.g., 20 MHz). In an embodiment, if an OFDM data unit 270 occupies a bandwidth that is greater than the smallest bandwidth of the WLAN 10, then each L-STF field, L-LTF field, L-SIG field, and HEW-SIG-A field is duplicated in each smallest bandwidth portion of the OFDM data unit 270 (e.g., in each 20 MHz portion of the data unit 270). On the other hand, each HEW-STF field, HEW-LTF field, HEW-SIGB field, and HEW data portion occupies an entire bandwidth of the corresponding OFDM data unit 270, in an embodiment. For example, the OFDM data unit 270-4 occupies 40 MHz, wherein the L-STF field, the L-LTF field, the L-SIG field, and HEW-SIGA field is duplicated in upper and lower 20 MHz bands of the OFDM data unit 270-4, while each of the HEW-STF field, the HEW-LTF fields, the HEW-SIGB field, and HEW data portion occupies the entire 40 MHz bandwidth of the data unit 270-4, in the illustrated embodiment.

In some embodiments, padding is used in one or more of the OFDM data units 270 to equalize lengths of the OFDM data units 270. Accordingly, the length of each of the OFDM data units 270 is padded as needed to correspond to the length of the OFDMA data unit 250, in this embodiment. Ensuring that the OFDM data units 270 are of equal lengths synchronizes transmission of acknowledgment frames by client stations 25 that receive the data units 270, in an embodiment. In an embodiment, one or more of the OFDM data units 270 is an aggregate MAC service data units (A-MPDU) (e.g., a very high throughput (VHT) A-MPDU that includes multiple aggregated VHT MAC service data units (MPDUs), an HEW A-MPDU that includes multiple aggregated HEW MAC service data units (MPDUs), or another suitable aggregated data unit that includes multiple aggregated MAC service data units (MPDUs)), which is in turn included in a PHY protocol data unit (PPDU). In another embodiment, one or more of the OFDM data units 270 is a single MPDU (e.g., a single VHT MPDU, a single HEW MPDU, or another suitable non-aggregated data unit) which is in turn included in a PPDU. In an embodiment, padding (e.g., zero-padding) within one or more of the A-MPDUs 270 or single MPDUs 270 is used to equalize the lengths of the data units 270, and to synchronize transmission of acknowledgment frames corresponding to the OFDMA data unit 250.

In an embodiment, the OFDM data units 270-1 and 270-2 share a legacy preamble 251-1 that occupies the smallest bandwidth of the WLAN 10 (e.g., 20 MHz) collectively spanned by the OFDM data units 270-1 and 270-2. In this embodiment, each of the OFDM data units 270-1 and 270-2 includes a respective HEW preamble 251-2 and a respective data portion 266 that each spans a bandwidth smaller than the smallest channel of the WLAN 10 (e.g., 10 MHz, 5 MHz, 2 MHz, or other suitable bandwidth). In the illustrated embodiment, the OFDM data units 270-1 and 270-2 include respective HEW preambles 251-2 and data portions 266 that each spans a 10 MHz bandwidth.

Figure 3A:
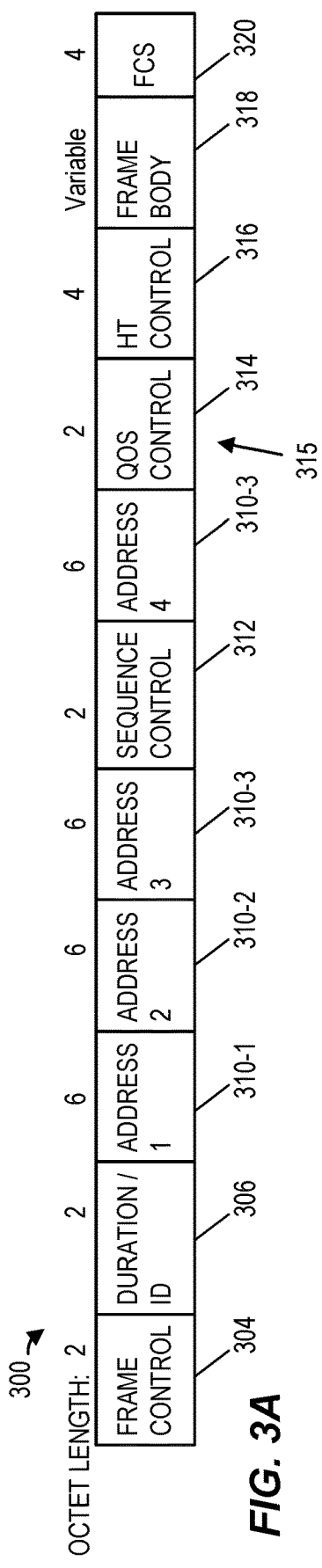
FIG. 3A is a diagram of an example medium access control (MAC) protocol data unit for a data frame, according to an embodiment.

FIG. 3A is a diagram of an example MPDU 300 for a data frame, according to an embodiment. In various embodiments and/or scenarios, the MPDU 300 is included in a downlink (DL) data unit transmitted by the AP 14 to one or more client stations 25. In some embodiments and/or scenarios, the MPDU 300 is included in an uplink (UL) data unit transmitted by a single client station 25 to the AP 14. In some embodiments and/or scenarios, the MPDU 300 is included in each of a plurality of data units within an uplink A-MPDU transmitted by a single client station 25 to the AP 14.

In some embodiments and/or scenarios, the MPDU 300 is included in a plurality of data units of a plurality of uplink A-MPDUs transmitted over respective OFDM sub-channels of an OFDMA transmission by multiple client stations (e.g., an uplink OFDMA A-MPDU). In some embodiments and/or scenarios, the plurality of data units correspond to one, two, three, or more traffic classes (TC) or traffic specification identified by different traffic identifications (TIDs). In some embodiments, the plurality of data units is transmitted from a plurality of client stations. In at least some embodiments, the plurality of data units is transmitted from a plurality of client stations and corresponds to one or more different TIDs.

In some embodiments and/or scenarios, the MPDU 300 is included in a downlink or uplink single A-MPDU transmitted in a SU PPDU. In some embodiments and/or scenarios, the plurality of data units correspond to one, two, three, or more traffic classes (TC) or traffic specification identified by different traffic identifications (TIDs).

The MPDU 300 generally corresponds to a MAC frame format as described in the IEEE 802.11-2012 Standard, in various embodiments. The MPDU 300 includes a frame control field 304 (2 octets), a duration/ID field 306 (2 octets), a first address field 310-1 (6 octets), a second address field 310-2 (6 octets), a third address field 310-3 (6 octets), a sequence control field 3112 (2 octets), a fourth address field 310-4 (6 octets), a QoS control field 314 (2 octets), a high throughput (HT) control field 316 (4 octets), a frame body 318 (variable number of octets), and a frame check sequence (FCS) field 320, in the illustrated embodiment. The number above each field in FIG. 3A indicates the number of octets occupied by the corresponding field, according to an example embodiment. Each of the address fields 310 is a 48 bit (6 octets) field that includes a MAC address of a device associated with the data unit 300, such as a transmitting device of the data unit 300, a receiving device of the data unit 300, etc.

The QoS control field 314 generally corresponds to the QoS control field as described in the IEEE 802.11-2012 Standard, in various embodiments. In an embodiment, for example, the QoS control field 314 includes an acknowledgment policy field 315 having two bits that identify an acknowledgment policy (Ack Policy) that is generally followed upon delivery of the corresponding MPDU. In an embodiment, the Ack Policy is mandatory and followed by the receiving station. In another embodiment, the Ack Policy is a recommended Ack Policy and the receiving station determines whether to follow the recommended Ack Policy or to disregard the recommended Ack Policy.

Figure 3B:
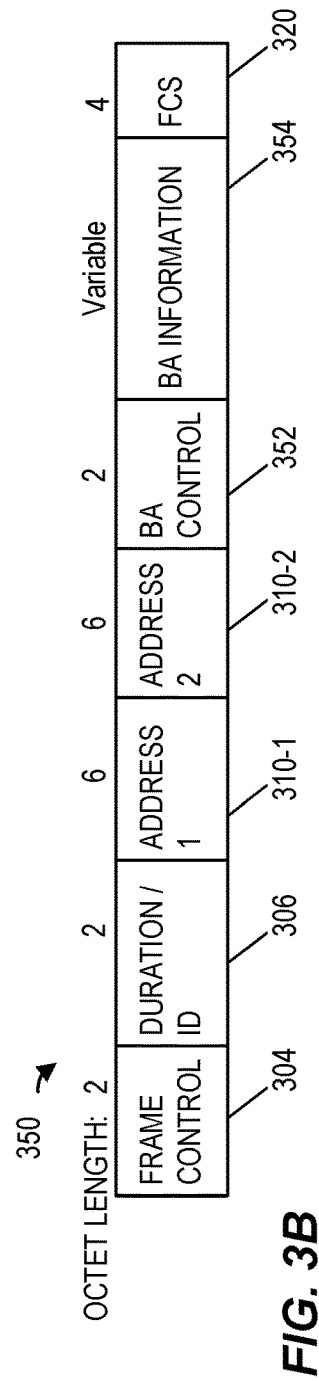
FIG. 3B is a diagram of an example MPDU for acknowledgment of an aggregate MPDU (A-MPDU), according to an embodiment.

FIG. 3B is a diagram of an example MPDU 350 for acknowledgment of an A-MPDU, according to an embodiment. In various embodiments and/or scenarios, the MPDU 350 is included in an acknowledgment data unit in response to a received A-MPDU. In an embodiment and/or scenario, the MPDU 350 is included in an acknowledgment data unit transmitted by the AP 14 to a single client station 25 to acknowledge an uplink data unit received by the AP 14 from the single client station 25. In another embodiment and/or scenario, the MPDU 350 is included in an acknowledgment data unit transmitted by the AP 14 to multiple client station 25 to acknowledge uplink data units simultaneously transmitted by the multiple client stations 25 to the AP 14. In an embodiment, the MPDU 350 is included in an acknowledgment data unit transmitted by a single client station 25 to the AP 14 to acknowledge a downlink data unit received by the single client station 25 from the AP 14. In an embodiment and/or scenario, the MPDU 350 is included in each of a plurality of acknowledgment data units transmitted over DL or UL OFDM sub-channels of an OFDMA transmission. In another embodiment and/or scenario, the MPDU 350 is included in an acknowledgment data unit that spans an entire OFDM communication channel.

In various embodiments and/or scenarios, the AP 14 generates the MPDU 350 to indicate an acknowledgment (or negative acknowledgment) of a plurality of data units within a previously received A-MPDU. In some embodiments and/or scenarios, the plurality of data units correspond to one, two, three, or more traffic classes identified by different TIDs. In some embodiments, the plurality of data units is transmitted from a plurality of client stations. In at least some embodiments, the plurality of data units is transmitted from a plurality of client stations and corresponds to one or more different TIDs for each of the plurality of client stations. In an embodiment, for example, the AP 14 receives an A-MPDU that includes a first MPDU with a first TID from a first client station, a second MPDU with a second TID from the first client station, and a third MPDU with the first TID from a second client station. In some embodiments, the plurality of data frames of the previously received A-MPDU includes a management frame and a request for Ack acknowledgement of the management frame.

The MPDU 350 is similar to a Block Ack frame format as described in the IEEE 802.11-2012 Standard, in various embodiments and/or scenarios. The MPDU 350 includes a frame control field 304 (2 octets), a duration/ID field 306 (2 octets), a first address (receiver address RA) field 310-1 (6 octets), a second address (transmitter address TA) field 310-2 (6 octets), a block acknowledgment (BA) control field 352 (2 octets), a BA information field 354 (variable number of octets), and a frame check sequence (FCS) field 320, in the illustrated embodiment. The number above each field in FIG. 3B indicates the number of octets occupied by the corresponding field, according to an example embodiment. The BA control field 352 and/or the BA information field 354 are configured to indicate acknowledgments for multiple uplink data units in various embodiments and/or scenarios, as described herein. The MPDU 350 includes one, two, three, or more instances of the BA information field 354, in various embodiments and/or scenarios. In an embodiment, for example, the AP 14 generates the MPDU 350 to include one BA information field 354 for each TID being acknowledged by the MPDU 350.

In an embodiment and/or scenario in which the MPDU 350 is included in a unicast acknowledgment data unit directed to only one client station 25, the first address field 310-1 includes a unicast address, such as a unicast MAC address, corresponding to the one client station 25 or the AP 14. On the other hand, in an embodiment and/or scenario in which the MPDU 350 is included in a broadcast acknowledgment data unit directed to multiple client stations 25, the first address field 310-1 includes a broadcast address, such as a broadcast MAC address, to indicate that the acknowledgment data unit is directed to multiple client stations 25.

Figure 4A:
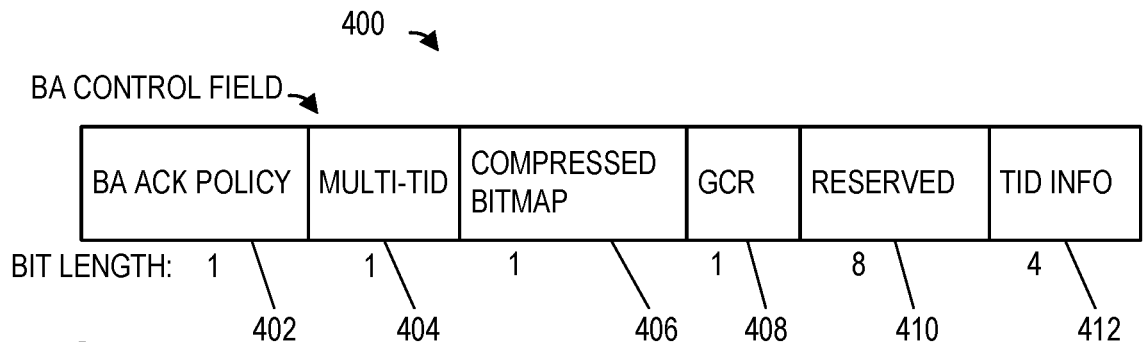
FIG. 4A, FIG. 4B, and FIG. 4C are diagrams of an example block acknowledgment (BA) control field, BA information field, and per traffic identification (TID) information subfield, according to an embodiment.
Figure 4B:
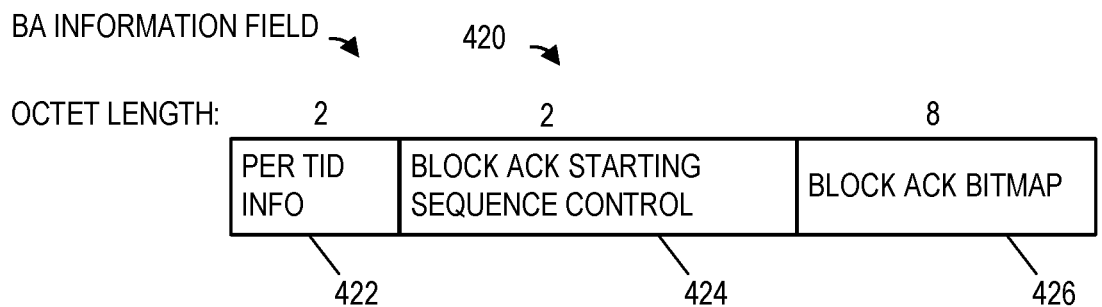
Figure 4C:
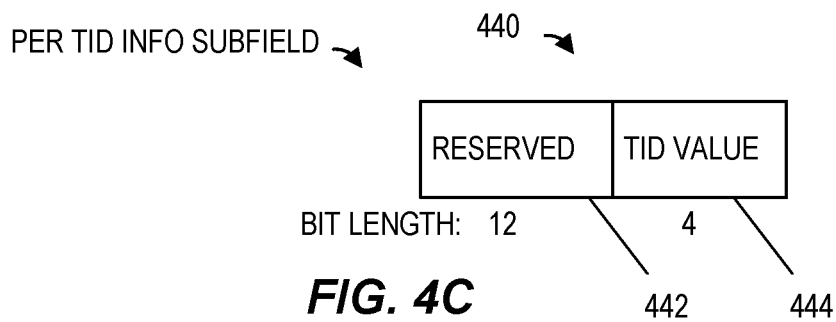

FIG. 4A, FIG. 4B, and FIG. 4C are diagrams of an example BA control field 400, an example BA information field 420, and an example per traffic identification (TID) information subfield 440, according to an embodiment. The number below each field in FIG. 4A and FIG. 4C indicates the number of bits occupied by the corresponding subfield, according to an example embodiment. The number above each field in FIG. 4B indicates the number of octets occupied by the corresponding subfield, according to an example embodiment.

The BA control field 400 corresponds to the BA control field 352, in an embodiment. In the embodiment illustrated in FIG. 4A, the BA control field 400 includes a BA Ack policy subfield 402 (1 bit), a multi-traffic class identifier (multi-TID) subfield 404 (1 bit), a compressed bitmap subfield 406 (1 bit), a GroupCast with Retries (GCR) subfield 408 (1 bit), a reserved subfield 410 (8 bits), and a TID information (TID INFO) subfield 412 (4 bits). In some embodiments, one or more of the subfields 402, 404, 406, 408, 410, and 412 are combined into a single subfield. In an embodiment, for example, the BA Ack policy subfield 402, the multi-TID subfield 404, the compressed bitmap subfield 406, and the GCR subfield 408 are combined into a single subfield.

The BA information field 420 corresponds to the BA information field 354, in an embodiment. In the embodiment illustrated in FIG. 4B, the BA information field 420 includes a per TID information (PER TID INFO) subfield 422 (2 octets), a Block Ack starting sequence control subfield 424 (2 octets), and a Block Ack bitmap subfield 426 (8 octets). The per TID information subfield 422 indicates a particular traffic class ID (TID) for the instance of the BA information field 420. In various embodiments, for example, the per TID information subfield 422 indicates a TID of 0, 1, 2, . . . 6, or 7. The Block Ack starting sequence control field 424 indicates a sequence number corresponding to the first one of the data units being acknowledged, and each bit of the Block Ack bitmap field 426 acknowledges a data unit with a sequence number that equals the sequence number indicated by the Block Ack starting sequence control field 424 plus the index of the bit. Thus, for example, the first bit (bit index 0) of the Ack bitmap field 426 acknowledges the data unit with the sequence number indicated by the Block Ack starting sequence control field 424, the second bit (bit index 1) of the Block Ack bitmap field 426 acknowledges the data unit with a sequence number indicated by the Block Ack starting sequence control field 424 plus 1, etc., in an embodiment. In an embodiment, the value of each bit of Block Ack bitmap field 426 indicates whether the corresponding data unit was successfully received by the AP 14. For example, a value of logic one (1) of a bit of Block Ack bitmap field 426 indicates that the corresponding data unit was successfully received by the AP 14, and a value of logic zero (0) of a bit of Block Ack bitmap field 426 indicates that the corresponding data unit was not successfully received (e.g., not received or received with an error) by the AP 14.

The per TID information subfield 440 corresponds to the per TID information subfield 422, in an embodiment. In the embodiment illustrated in FIG. 4C, the per TID information subfield 440 includes a reserved subfield 442 (12 bits) and a TID value subfield 444 (4 bits). The TID value subfield 444 indicates a value for a TID of the corresponding BA information field 420. In an embodiment, for example, the MPDU 300 acknowledges frames corresponding to TIDs of 0, 3, and 7. In this embodiment, the MPDU 300 includes three instances of the BA information field 420 where the first instance has a TID value of 0 in the TID value subfield 444 of the per TID information field 422, the second instance has a TID value of 3 in the TID value subfield 444 of the per TID information field 422, and the third instance has a TID value of 7 in the TID value subfield 444 of the per TID information field 422.

The BA control field 400 and the BA information field 420 are similar to the BA control field and BA information field of the BlockAck frame format as defined by the IEEE 802.11-2012 Standard. Although the BA control field 400 and the BA information field 420 allow for acknowledgments to MPDUs from multiple TIDs (e.g., a multi-TID block acknowledgment), the multi-TID block acknowledgment does not support a block acknowledgment for multiple TIDs from multiple client stations.

In various embodiments and/or scenarios, the AP 14 and/or client station 25 negotiate to utilize multi-TID block acknowledgments in OFDMA or MU-MIMO transmissions. In some embodiments, an AP 14 or client station 25 announces whether it supports a multi-TID A-MPDU (e.g., an A-MPDU having A-MPDU subframes with at least some different TIDs). When a client station 25 announces support for a multi-TID A-MPDU, the AP 14 with which the client station 25 is associated may transmit A-MPDUs having multiple TIDs to the client station 25. When the AP 14 announces support for a multi-TID A-MPDU, the client station 25 may transmit an A-MPDU having multiple TIDs to the AP 14. In some embodiments, the AP 14 and the client 25 negotiate to determine an individual buffer size for at least some TIDs. In an embodiment, the AP 14 and the client 25 negotiate to determine an overall buffer size for a multi-TID A-MPDU.

Figure 5B:
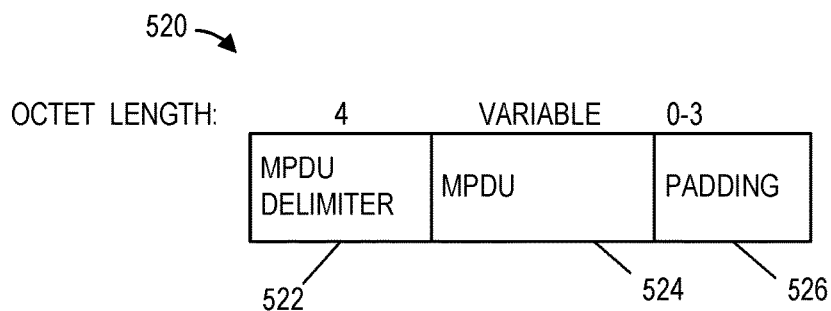
Figure 5C:
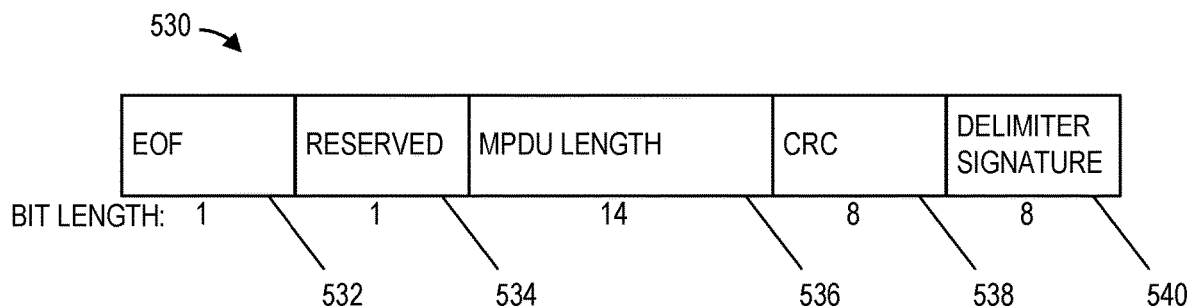

FIG. 5A, FIG. 5B, and FIG. 5C are diagrams of an example aggregate MPDU (A-MPDU) 500, an example A-MPDU subframe 520, and an example MPDU delimiter 530, according to an embodiment. The number above each field in FIG. 5B indicates the number of octets occupied by the corresponding subfield, according to an example embodiment. The number below each field in FIG. 5C indicates the number of bits occupied by the corresponding subfield, according to an example embodiment. The A-MPDU 500 includes a sequence of an integer number N of A-MPDU subframes, where N is one, two, three, or more. In the illustrated embodiment, the A-MPDU 500 includes A-MPDU subframes 502, 504, and 506, which are followed by an optional end of frame (EoF) padding field 508.

The A-MPDU subframe 520 corresponds to one or more of the A-MPDU subframes 502, 504, or 506, in an embodiment. The A-MPDU subframe 520 includes an MPDU delimiter field 522 (4 bytes), an MPDU 524 having a variable length, and optionally a padding field 526 (0 to 3 bytes). The MPDU delimiter 530 corresponds to the MPDU delimiter 522, in an embodiment. The MPDU delimiter 530 includes an end of frame (EOF) subfield 532 (1 bit), a reserved subfield 534 (1 bit), an MPDU length subfield 536 (14 bits), a cyclic redundancy check (CRC) subfield 538 (8 bits), and a delimiter signature subfield 540 (8 bits).

In an embodiment and/or scenario, the EOF field 532 is set to 0 by default, but is set to 1 i) in an A-MPDU subframe that has a value of 0 in the MPDU length subfield 536 and is used to pad the A-MPDU in a VHT PPDU, or ii) in an MPDU delimiter of a VHT single MPDU. In this embodiment, the AP 14 or client station 25 sets the EOF field 532 according to the IEEE 802.11ac Standard (Section 8.6, Aggregate MPDU).

In some embodiments and/or scenarios, the AP 14 or client station 25 aggregates a management frame or a data frame that corresponds to a normal acknowledgment (e.g., which asks for Ack) within an OFDMA A-MPDU, for example, within the A-MPDU 500. However, the acknowledgment policy bits of the QoS control field 314 by themselves do not provide for an indication to differentiate Ack and BA within an A-MPDU. In some embodiments and/or scenarios, the AP 14 or client station 25 sets i) the acknowledgment policy bits of the corresponding QoS control field 314 to immediate Ack/BA, and ii) sets the EOF field 532 of the corresponding MPDU delimiter 530 to 1 and the MPDU Length field 534 to a non-zero value in order to indicate an acknowledgment policy for the corresponding MPDU within an OFDMA A-MPDU. In an embodiment and/or scenario, the AP 14 sets the acknowledgment policy bits and the EOF field 532 so that an MPDU having an acknowledgment policy corresponding to a normal acknowledgment request (e.g., Normal Ack Request) can be sent within an OFDMA A-MPDU. In other words, the AP 14 utilizes the EOF field 532 and the MPDU Length field 534 to differentiate between a normal acknowledgment request and a block acknowledgment request.

In an embodiment and/or scenario, for example, the AP 14 generates an A-MPDU that includes a "normal ACK" MPDU that has an acknowledgment policy corresponding to a Normal Ack Request. In other words, a recipient of the normal ACK MPDU within the A-MPDU is requested to acknowledge the receipt of the normal ACK MPDU by transmitting an acknowledgment frame after a short interframe space (SIFS) period after the A-MPDU. In this embodiment and/or scenario, the AP 14 sets the EOF field 532 to 1, sets the MPDU length field 536 to a non-zero value, and sets the acknowledgment policy bits of the corresponding QoS control field 314 to a normal acknowledgment policy (e.g., a value of "00") to indicate the normal ACK policy for the normal ACK MPDU. In some embodiments and/or scenarios, the normal ACK MPDU includes a management frame. In an embodiment, the AP 14 generates the A-MPDU to include multiple normal ACK MPDUs within an OFDMA A-MPDU. In an embodiment, for example, the AP 14 generates the A-MPDU to include at most one frame from each TID corresponding to a normal acknowledgment (e.g., which asks for Ack). In an embodiment, the AP 14 generates the A-MPDU to include at most one management frame that solicits a normal acknowledgement.

In some embodiments and/or scenarios, the AP 14 generates an A-MPDU that includes a "block ack" MPDU that has an acknowledgment policy corresponding to a block acknowledgment, for example, an immediate block acknowledgment (e.g., where the recipient responds with a BlockAck after a SIFS period) or a delayed block acknowledgment (e.g., where the recipient waits for receipt of a BlockAckReq frame before providing an acknowledgment). In an embodiment the AP 14 generates an A-MPDU that includes "block ack" MPDUs from multiple TIDs. In an embodiment and/or scenario for an immediate BlockAck, the AP 14 sets the EOF field 532 to 0, sets the MPDU length field 536 to a non-zero value, and sets the acknowledgment policy bits of the corresponding QoS control field 314 to an implicit block acknowledgment request (e.g., a value of "00"). In an embodiment and/or scenario, in response to the receipt of an MPDU corresponding to an EOF field 532 being set to 0 and the implicit block acknowledgment request, the recipient acknowledges the MPDU with a BlockAck after a SIFS period.

In some embodiments and/or scenarios for a delayed block acknowledgment, the AP 14 sets the EOF field 532 to 0, sets the MPDU length field 536 to a non-zero value, and sets the acknowledgment policy bits of the corresponding QoS control field 314 to an explicit block acknowledgment request (e.g., a value of "11").

Figure 6A:
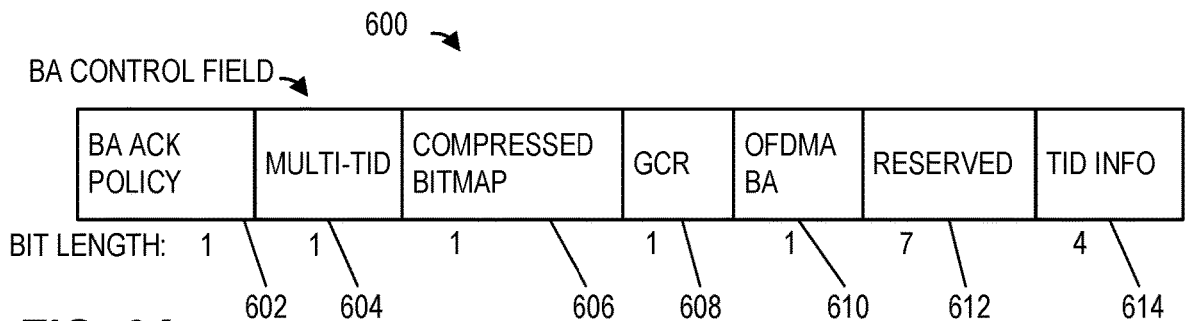
FIG. 6A, FIG. 6B, and FIG. 6C are diagrams of an example BA control field, an example BA information field, and an example per TID information subfield, according to an embodiment.
Figure 6B:
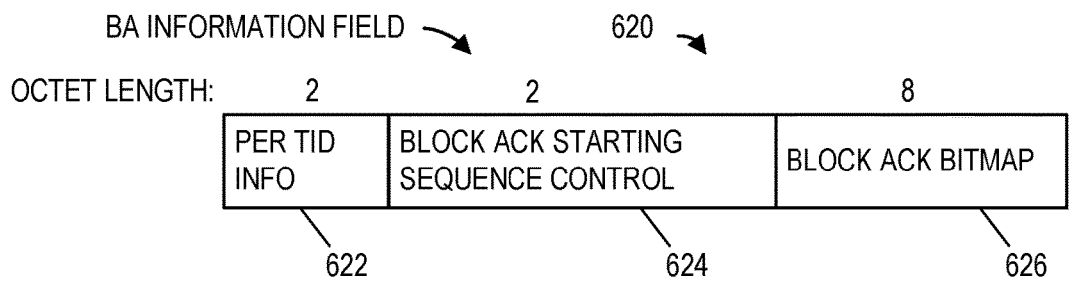
Figure 6C:
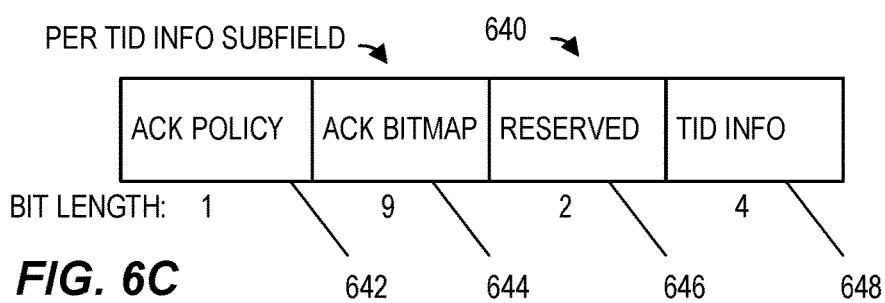

FIG. 6A, FIG. 6B, and FIG. 6C are diagrams of an example BA control field 600, an example BA information field 620, and an example per TID information subfield 640, according to an embodiment. The number below each field in FIG. 6A and FIG. 6C indicates the number of bits occupied by the corresponding subfield, according to an example embodiment. The number above each field in FIG. 6B indicates the number of octets occupied by the corresponding subfield, according to an example embodiment.

The BA control field 600 corresponds to the BA control field 352, in an embodiment. In the embodiment illustrated in FIG. 6A, the BA control field 600 includes a BA Ack policy subfield 602 (1 bit), a multi-TID subfield 604 (1 bit), a compressed bitmap subfield 606 (1 bit), a GCR subfield 608 (1 bit), an orthogonal frequency division multiple access (OFDMA) Block Ack subfield 610 (1 bit), a reserved subfield 612 (7 bits), and a TID information (TID INFO) subfield 614 (4 bits). Subfields 602, 604, 606, 608, and 614 of BA control field 600 generally correspond to subfields 402, 404, 406, 408, and 414 of BA control field 400 (FIG. 4A), in an embodiment. The BA control field 600 additionally includes the OFDMA Block Ack subfield 610 as a bit taken from the reserved subfield 410 as compared to the BA control field 400.

The BA information field 620 corresponds to the BA information field 354, in an embodiment. In the embodiment illustrated in FIG. 6B, the BA information field 620 includes a per TID information (PER TID INFO) subfield 622 (2 octets), a Block Ack starting sequence control subfield 624 (2 octets), and a Block Ack bitmap subfield 626 (8 octets). Subfields 622, 624, and 626 of BA information field 620 generally correspond to subfields 422, 424, and 426 of the BA information field 420, in an embodiment.

The per TID information subfield 640 corresponds to the per TID information subfield 622, in an embodiment. In the embodiment illustrated in FIG. 6C, the per TID information subfield 640 includes an Ack Policy subfield 642 (1 bit), an Ack Bitmap subfield 644 (9 bits), a reserved subfield 646 (2 bits), and a TID value subfield 648 (4 bits). The TID value subfield 648 indicates a value for a TID of the corresponding BA information field 620.

The AP 14 or client station 25 generates the MPDU 350 with the BA control field 600 and the BA information field 620 as a unicast frame which includes block acknowledgments and/or single acknowledgments, in various embodiments and/or scenarios. In an embodiment, each block acknowledgment indicates respective acknowledgments for multiple MPDUs belonging to a single TID and each single acknowledgment indicates an acknowledgment for a single MPDU belonging to a single TID. In some embodiments and/or scenarios, the AP 14 or client station 25 utilizes the single acknowledgment to indicate an acknowledgment for a management frame by setting the corresponding TID value subfield 648 to a predetermined value (e.g., a value greater than 7, a value of 15, or other suitable value).

The OFDMA Block Ack subfield 610 indicates whether the MPDU 350 is an OFDMA multi-TID block acknowledgment, in various embodiments and/or scenarios. In an embodiment, the AP 14 or client station 25 sets the OFDMA Block Ack subfield 610 and the Ack Policy subfield 642 to predetermined values to indicate that the per TID information subfield 640 includes the acknowledgment bitmap 644 (e.g., by setting both subfields to "1"). In this embodiment, the Block Ack starting sequence control field 624 and the block ack bitmap 626 are omitted and the acknowledgment bitmap 644 provides an acknowledgment. In an embodiment, for example, bits 1 to 8 of the acknowledgment bitmap 644 indicate whether MPDUs from TID0 through TID7, respectively, are acknowledged. In an embodiment, bit 9 of the acknowledgment bitmap 644 indicates whether a management frame is acknowledged.

Although the acknowledgment bitmap 644 is shown as a subfield within the per TID information field 640, in other embodiments, the acknowledgment bitmap 644 is a separate field (e.g., a 2 octet field) that follows the per TID information field 622 when the OFDMA Block Ack subfield 610 indicates that the Block Ack starting sequence control field 624 and the block ack bitmap 626 are omitted. In other words, the OFDMA Block Ack subfield 610 indicates whether the per TID information field 622 is followed by the Block Ack starting sequence control field 624 and the block ack bitmap 626 or followed by the acknowledgment bitmap. In another embodiment, the OFDMA Block Ack subfield 610 indicates whether the acknowledgment bitmap 644 precedes the per TID information subfield 622 (e.g., the acknowledgment bitmap 644 follows the BA control field 600). In this embodiment, when none of the MPDUs are being acknowledged, the acknowledgment bitmap 644 is set to zero.

Figure 7A:
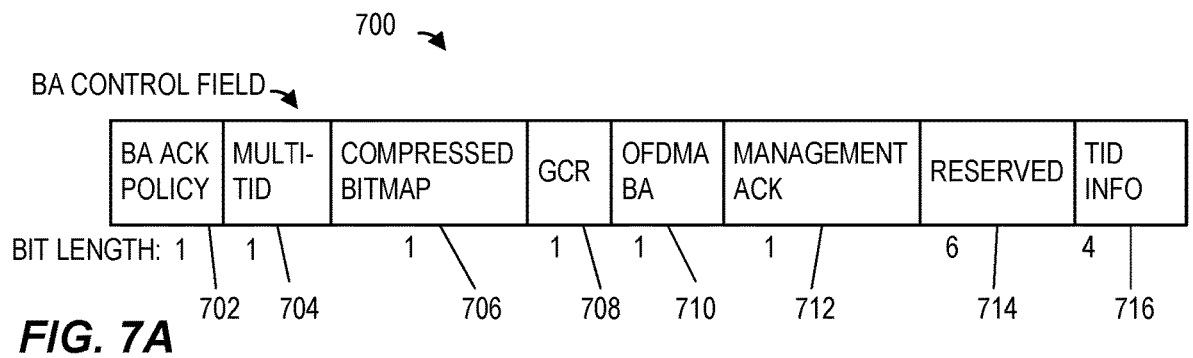
FIG. 7A and FIG. 7B are diagrams of an example BA control field and an example BA information field, according to an embodiment.
Figure 7B:
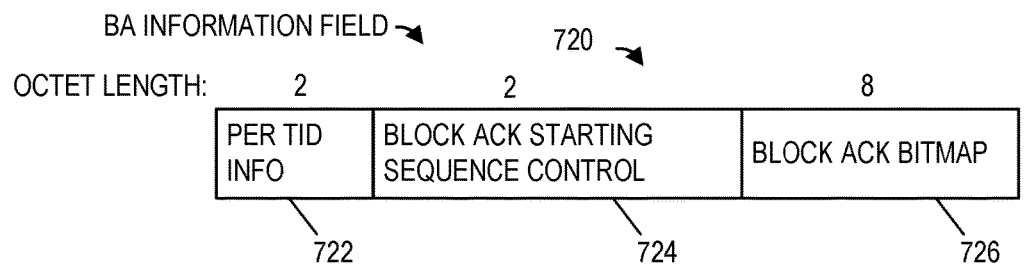

FIG. 7A and FIG. 7B are diagrams of an example BA control field 700 and an example BA information field 720, according to an embodiment. The BA control field 700 corresponds to the BA control field 352, in an embodiment. In the embodiment illustrated in FIG. 7A, the BA control field 700 includes a BA Ack policy subfield 702 (1 bit), a multi-TID subfield 704 (1 bit), a compressed bitmap subfield 706 (1 bit), a GCR subfield 708 (1 bit), an OFDMA Block Ack subfield 710 (1 bit), a management acknowledgment subfield 712 (1 bit), a reserved subfield 714 (6 bits), and a TID information (TID INFO) subfield 716 (4 bits). Subfields 702, 704, 706, 708, 710, and 716 of BA control field 700 generally correspond to subfields 602, 604, 606, 608, 610, and 614 of the BA control field 600, in an embodiment. Instead of using 9-bit Ack bitmap to indicate Ack for a data frame and a management frame, the BA control field 700 additionally includes the management acknowledgment subfield 712 as a bit taken from the reserved subfield 612 as compared to the BA control field 600. The BA information field 720 corresponds to the BA information field 354, in an embodiment. In the embodiment illustrated in FIG. 7B, the BA information field 720 includes a per TID information (PER TID INFO) subfield 722 (2 octets), a Block Ack starting sequence control subfield 724 (2 octets), and a Block Ack bitmap subfield 726 (8 octets). In an embodiment, the per TID info subfield 640 having a length of 8 bits for the acknowledgment bitmap 644 is part of Block Ack frame.

The BA control field 700 and the BA information field 720 are generally similar to the BA control field 600 and the BA information field 620, except that the BA control field 700 also includes the management acknowledgment subfield 712. The AP 14 or client station 25 sets the management acknowledgment subfield 712 (or another suitable bit of the BA control field 700) to a value that acknowledges receipt of a management frame.

Figure 8A:
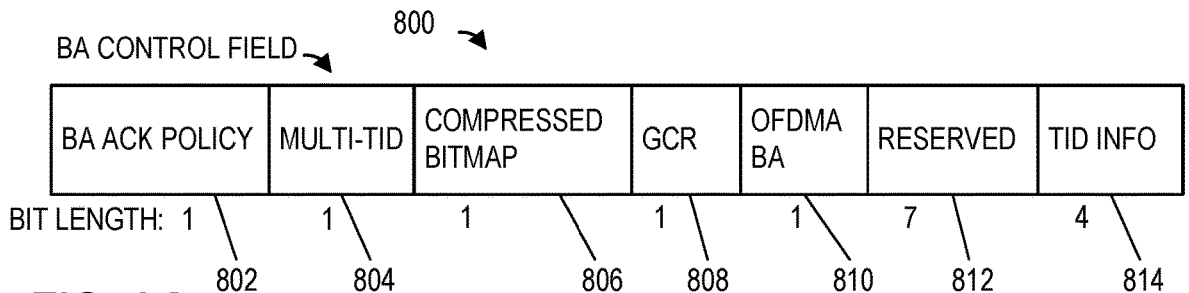
FIG. 8A, FIG. 8B, and FIG. 8C are diagrams of an example BA control field, an example BA information field, and an example per TID information subfield, according to an embodiment.
Figure 8B:
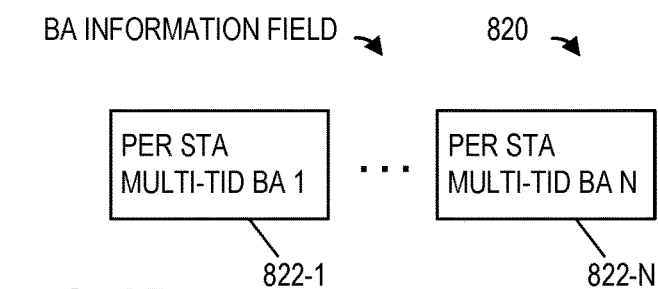
Figure 8C:
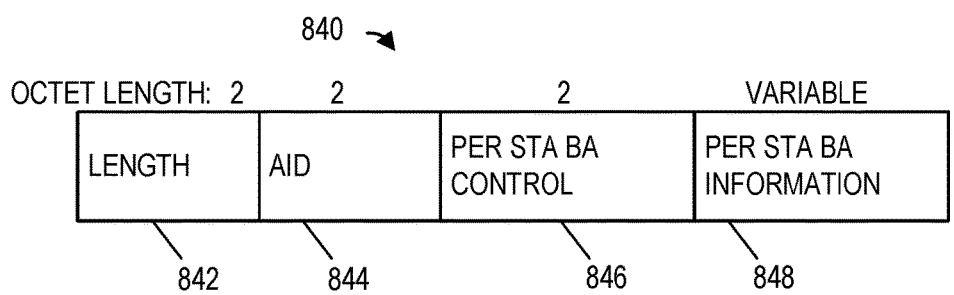

FIG. 8A, FIG. 8B, and FIG. 8C are diagrams of an example BA control field 800, BA information field 820, and a per station multi-TID block ack subfield 840, according to an embodiment. The BA control field 800 corresponds to the BA control field 352, in an embodiment. In the embodiment illustrated in FIG. 8A, the BA control field 800 includes a BA Ack policy subfield 802 (1 bit), a multi-TID subfield 804 (1 bit), a compressed bitmap subfield 806 (1 bit), a GCR subfield 808 (1 bit), an orthogonal frequency division multiple access (OFDMA) Block Ack subfield 810 (1 bit), a reserved subfield 812 (7 bits), and a TID information (TID INFO) subfield 814 (4 bits). The subfields 802, 804, 806, 808, 810, 812, and 814 of the BA control field 800 generally correspond to the subfields 602, 604, 606, 608, 610, 612, and 614 of the BA control field 600, in an embodiment.

The AP 14 or client station 25 generates the MPDU 350 with the BA control field 800 and the BA information field 820 as a broadcast frame which includes a multi-TID block acknowledgment for multiple stations or as a unicast frame which includes a multi-TID block acknowledgment for a single station, in various embodiments and/or scenarios. In an embodiment, the AP 14 sets the OFDMA BA field 810 to a predetermined value (e.g., "1") and sets the corresponding receiver address 310-1 to a broadcast receiver address to indicate that the MPDU 350 is an OFDMA multi-TID block acknowledgment. In an embodiment, the client station set the OFDMA BA field 810 to a predetermined value (e.g., "1") and sets the corresponding receiver address 310-1 to the MAC address of the AP 14 to indicate that the MPDU 350 is a multi-TID block acknowledgment.

The BA information field 820 corresponds to the BA information field 354, in an embodiment. In the embodiment illustrated in FIG. 8B, the BA information field 820 includes an integer number N of per station multi-TID block ack subfields 822. The per station multi-TID block ack subfield 840 corresponds to the per station multi-TID block ack subfields 822, in an embodiment. An instance of the per station multi-TID block ack subfield 840 is provided for each client station with a corresponding acknowledgment within a data unit, in an embodiment. In the embodiment illustrated in FIG. 8C, the per station multi-TID block ack subfield 840 includes a length subfield 842 (2 octets), a device identifier subfield 844 (2 octets), a per station Block Ack control subfield 846 (2 octets), and a per station Block Ack information subfield 848 (variable number of octets).

The device identifier subfield 844 includes an identifier associated with the device or client station 25 for which corresponding acknowledgment information is intended, in an embodiment. In various embodiments and/or scenarios, the device identifier 844 is an association ID (e.g., 11 bits). In an embodiment and/or scenario, the device identifier 844 includes a partial association ID (e.g., 9 bits) and one or more reserved or unused bits. The length subfield 842 indicates a length of the corresponding per station multi-TID block ack subfield 822. The per station Block Ack control subfield 846 and the per station Block Ack information subfield 848 are similar to the BA control field 400 and the BA information field 420, in an embodiment. In another embodiment, the per station Block Ack control subfield 846 and the per station Block Ack information subfield 848 are similar to those in the IEEE 802.11REV mc Standard. In an embodiment, the per station Block Ack control subfield 846, the length subfield 842, and the device identifier 844 are at least partially combined to have a total length of four octets or another suitable length.

Figure 9A:
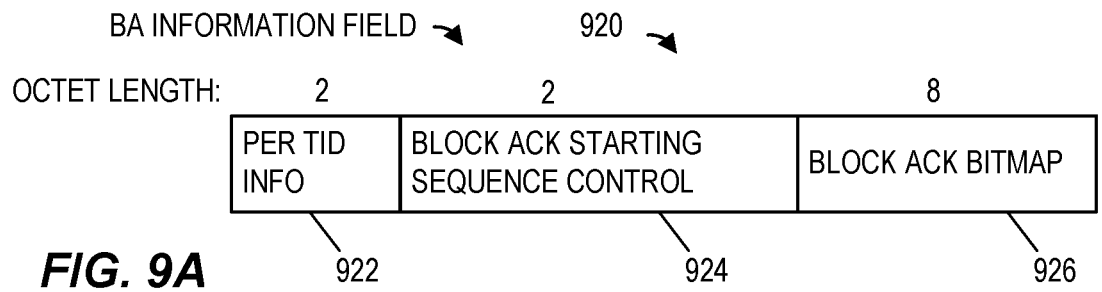
FIG. 9A, FIG. 9B, and FIG. 9C are diagrams of a first example BA information field, a second example BA information field, and an example per TID information subfield, according to an embodiment.
Figure 9B:
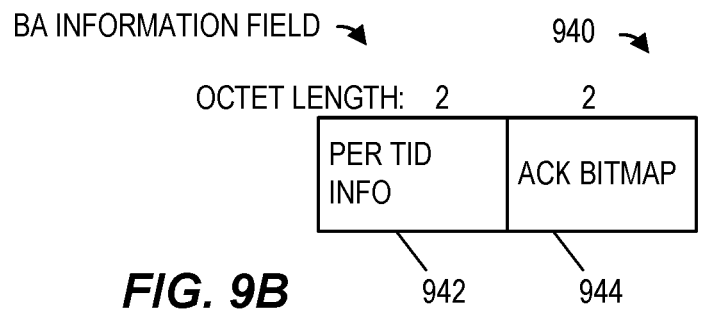
Figure 9C:
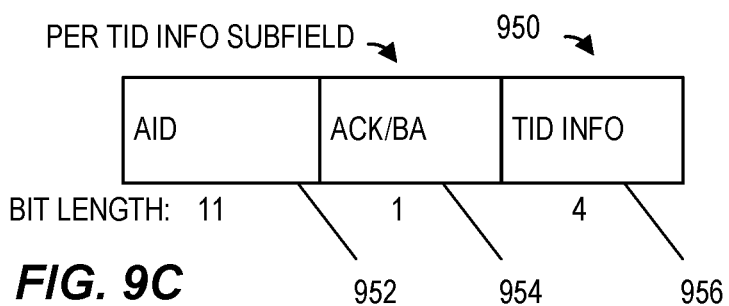
Figure 10A:
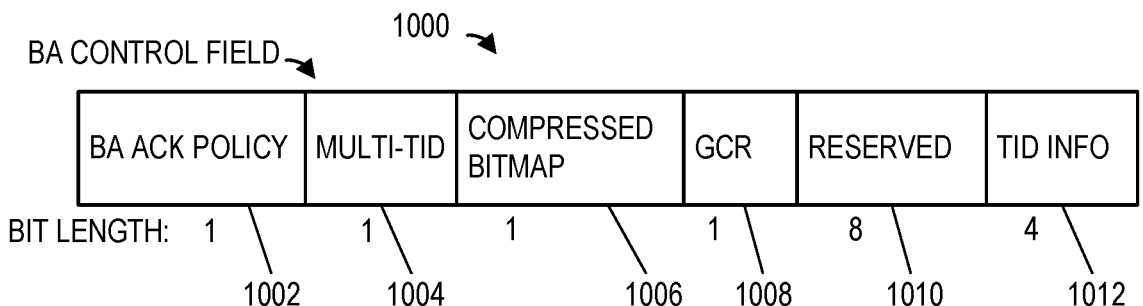
FIG. 10A, FIG. 10B, FIG. 10C, and FIG. 10D are diagrams of an example BA control field, an example BA information field, an example per TID information subfield, and an example BA starting sequence control field, according to an embodiment.
Figure 10B:
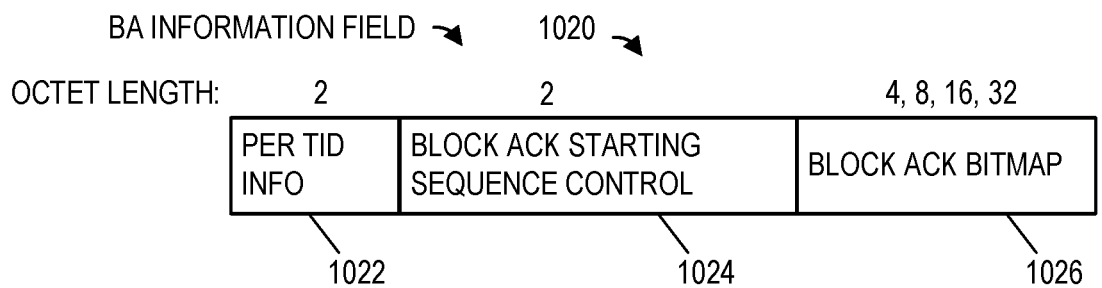
Figure 10C:
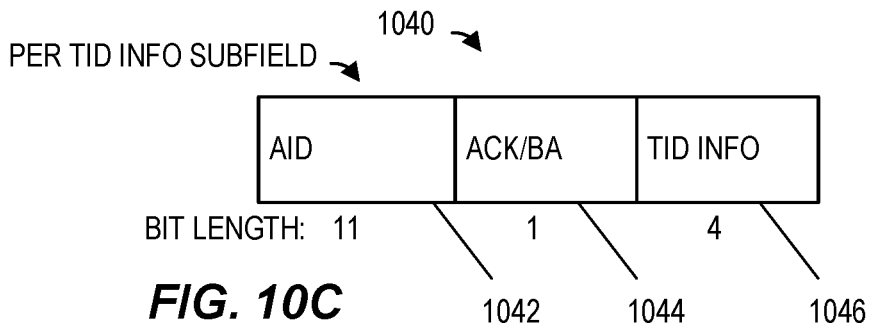
Figure 10D:
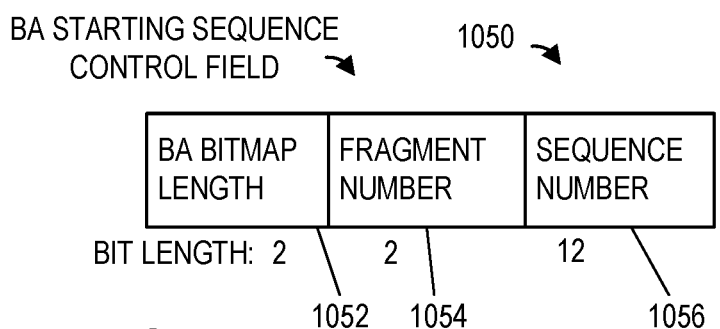

FIG. 9A, FIG. 9B, and FIG. 9C are diagrams of a first example BA information field 920, a second example BA information field 940, and an example per TID information subfield 950, according to an embodiment and/or scenario. In an embodiment, the AP 14 or client station 25 generates an MPDU 350 that includes the BA control field 800 (FIG. 8A) and one or more of the BA information field 920 and/or the BA information field 940. In this embodiment, the MPDU 350 is a broadcast frame where the OFDMA BA field 810 indicates that the MPDU 350 includes block acknowledgments for multiple TIDs of multiple client stations or a unicast frame where the OFDMA BA field 810 indicates that the MPDU 350 includes block acknowledgments for multiple TIDs of a single client station.

The BA information field 920 corresponds to the BA information field 354, in an embodiment and/or scenario. In the embodiment illustrated in FIG. 9A, the BA information field 920 includes a per TID information (PER TID INFO) subfield 922 (2 octets), a Block Ack starting sequence control subfield 924 (2 octets), and a Block Ack bitmap subfield 926 (8 octets). Subfields 924 and 926 of BA information field 920 generally correspond to subfields 424 and 426 of the BA information field 420, in an embodiment. The BA information field 940 corresponds to the BA information field 354, in an embodiment and/or scenario. In an embodiment, the Block Ack starting sequence control subfield 924 and the Block Ack bitmap subfield 926 are optional in the BA Information field 920. In an embodiment, for example, the Ack/BA field 954 indicates whether the Block Ack starting sequence control subfield 924 and the Block Ack bitmap subfield 926 follow the per TID information subfield 922 in the BA Information field 920. In the embodiment illustrated in FIG. 9B, the BA information field 940 includes a per TID information subfield 942 (2 octets) and an acknowledgment bitmap 944 (2 octets). The acknowledgment bitmap 944 is similar to the acknowledgment bitmap 644, with additional bits being reserved (e.g., eight bits for TIDs 0 to 7, one bit for a management frame, and seven reserved bits).

The per TID information subfield 950 corresponds to the per TID information subfield 922 or the per TID information subfield 942, in various embodiment and/or scenarios. In the embodiment illustrated in FIG. 9C, the per TID information subfield 950 includes a device identifier 952 (11 bits), an ACK/BA subfield 954 (1 bit), and a TID value subfield 956 (4 bits). The device identifier 952 includes an identifier associated with the device or client station 25 for which corresponding acknowledgment information is intended, in an embodiment. In various embodiments and/or scenarios, the device identifier 952 is an association ID (e.g., 11 bits). In an embodiment and/or scenario, the device identifier 952 includes a partial association ID (e.g., 9 bits) and one or more reserved or unused bits. In various embodiments and/or scenarios, when the per TID information field 922 or 942 includes AID information for a client station (e.g., an association ID or partial association ID), the block ack frame is a broadcast frame which includes multiple different AID values or is a unicast frame which includes same AID values for different TIDs.

The ACK/BA subfield 954 indicates the type or format of the corresponding BA information field, in various embodiments and/or scenarios. In an embodiment, for example, a first value (e.g., "0") for the ACK/BA subfield 954 indicates that the corresponding BA information field follows the format of the BA information field 920 and a second value (e.g., "1") for the ACK/BA subfield 954 indicates that the corresponding BA information field follows the format of the BA information field 940. In other embodiments, other suitable values and/or formats are utilized. The TID value subfield 956 includes a value that corresponds to the traffic class of the corresponding acknowledgment information, in an embodiment. In an embodiment, the TID value subfield 956 is reserved if the Ack/BA subfield 954 indicates an Ack acknowledgement where the BA information field 920 doesn't include the Block Ack Start Sequence Control field 924 and the Block Ack Bitmap 926. In an embodiments, the AP 14 or client station 25 sets the ACK/BA subfield 954 to the second value for a single acknowledgment (e.g., similar to the BA information field 940) and sets the TID value subfield 956 to a value of the TID that is being acknowledged or to a predetermined value (e.g., 15) to indicate acknowledgment of a management frame. In one such embodiment, the acknowledgment bitmap 944 is omitted.

FIG. 10A, FIG. 10B, FIG. 10C, and FIG. 10D are diagrams of an example BA control field 1000, an example BA information field 1020, an example per TID information subfield 1040, and an example BA starting sequence control field 1050, according to an embodiment. The number below each field in FIG. 10A, FIG. 10C, and FIG. 10D indicates the number of bits occupied by the corresponding subfield, according to an example embodiment. The number above each field in FIG. 10B indicates the number of octets occupied by the corresponding subfield, according to an example embodiment.

The AP 14 or client station 25 generates the MPDU 350 with the BA control field 1000 and the BA information field 1020 as a broadcast frame which includes a multi-TID M-BA block acknowledgment for multiple stations or as a unicast frame which includes a multi-TID M-BA block acknowledgment for a single station, in various embodiments and/or scenarios. The BA control field 1000 corresponds to the BA control field 352, in an embodiment. In the embodiment illustrated in FIG. 10A, the BA control field 1000 includes a BA Ack policy subfield 1002 (1 bit), a multi-traffic class identifier (multi-TID) subfield 1004 (1 bit), a compressed bitmap subfield 1006 (1 bit), a GroupCast with Retries (GCR) subfield 1008 (1 bit), a reserved subfield 1010 (8 bits), and a TID information (TID INFO) subfield 1012 (4 bits). In some embodiments, one or more of the subfields 1002, 1004, 1006, 1008, 1010, and 1012 are combined into a single subfield. In an embodiment, for example, the BA Ack policy subfield 1002, the multi-TID subfield 1004, the compressed bitmap subfield 1006, and the GCR subfield 1008 are combined into a single subfield.

One or multiple BA information fields 1020 corresponds to the BA information field 354, in an embodiment. In the embodiment illustrated in FIG. 10B, the BA information field 1020 includes a per TID information (PER TID INFO) subfield 1022 (2 octets), a Block Ack starting sequence control subfield 1024 (2 octets), and a Block Ack bitmap subfield 1026 (variable number of octets). The per TID information subfield 1022 indicates a particular traffic class ID (TID) for the instance of the BA information field 1020. In an embodiment, the Block Ack starting sequence control subfield 1024 and the Block Ack bitmap subfield 1026 are optional fields in the BA information field 1020. In an embodiment, for example, an ACK/BA subfield 1044 (described below) indicates whether the Block Ack starting sequence control subfield 1024 and the Block Ack bitmap subfield 1026 follow the per TID information subfield 1022.

The per TID information subfield 1040 corresponds to the per TID information subfield 1022, in an embodiment. In the embodiment illustrated in FIG. 10, the per TID information subfield 1040 includes a device identifier subfield 1042 (11 bits), an ACK/BA subfield 1044 (1 bit), and a TID value subfield 1046 (4 bits). In an embodiment, the device identifier subfield 1042, the ACK/BA subfield 1044, and the TID value subfield 1046 generally correspond to the device identifier subfield 952, the ACK/BA subfield 954, and the TID value subfield 956 of the per TID information subfield 950 where the per TID information subfield is not reserved. In an embodiment, for each TID that requires an Ack acknowledgement, the following three subfields exist: the device identifier subfield 1042, the ACK/BA subfield 1044, and the TID value subfield 1046. In an embodiment, the AP 14 or client station 25 sets the TID value subfield to a predetermined value (e.g., a value greater than 7, a value of 15, or other suitable value) to indicate an acknowledgment of a management frame.

The Block Ack starting sequence control subfield 1050 corresponds to the block ack starting sequence control subfield 1024, in an embodiment. In the illustrated embodiment, the Block Ack starting sequence control subfield 1050 includes a block ack bitmap length indication 1052 (2 bits), a fragment number 1054 (2 bits), and a sequence number 1056 (12 bits). In other embodiments, the block ack bitmap length indication includes more bits or fewer bits. In other embodiments, the block ack bitmap length indication 1052, the fragment number 1054, and the sequence number 1056 appear in a different order within the Block Ack starting sequence control field 1050. The block ack bitmap length indication 1052 indicates the length of the block acknowledgment bitmap 1026, in various embodiments. In an embodiment, the bitmap length indication is a subfield having one or more bits where the value of the bits indicates one length of a plurality of predetermined lengths. In an embodiment, for example, the bitmap length indication includes two bits for four values corresponding to four predetermined lengths of 4 octets, 8 octets, 16 octets, and 32 octets. In other embodiments, other suitable numbers of pluralities of predetermined lengths (e.g., two different lengths, eight different lengths, etc.) and/or other values of the predetermined lengths are utilized. The length of the block acknowledgment bitmap 1026 of a TID is less than the buffer size defined during block acknowledgment negotiation (e.g., ADDBA negotiation), in some embodiments.

The sequence number 1056 indicates a sequence number corresponding to the first one of the data units being acknowledged, and each bit of the Block Ack bitmap field 1026 acknowledges a data unit with a sequence number that equals the sequence number 1056 plus the index of the bit within the Block Ack bitmap field 1026, in an embodiment. Thus, for example, the first bit (bit index 0) of the Block Ack bitmap field 1026 acknowledges the data unit with the sequence number indicated by the Block Ack starting sequence control field 1024, the second bit (bit index 1) of the Block Ack bitmap field 1026 acknowledges the data unit with a sequence number indicated by the Block Ack starting sequence control field 1024 plus 1, etc., in an embodiment. In an embodiment, the value of each bit of Block Ack bitmap field 1026 indicates whether the corresponding data unit was successfully received by the AP 14.

In an embodiment, the AP 14 or client station 25 generates the MPDU 350 with the BA control field 1000 and the BA information field 1020, but replaces the block ack starting sequence control field 1024 and the block ack bitmap 1026 with the block ack starting sequence control field 424 and the block ack bitmap 1026, respectively. In other words, the block ack bitmap has a predetermined size instead of a variable size. In this embodiment, the ACK/BA subfield 1044 indicates whether the Block Ack starting sequence control subfield 424 and the Block Ack bitmap subfield 426 follow the per TID information subfield 1022. In other words, the ACK/BA subfield 1044 differentiates between an Ack or Block Ack for the TID value indicated by the TID information field 1046.

Figure 11A:
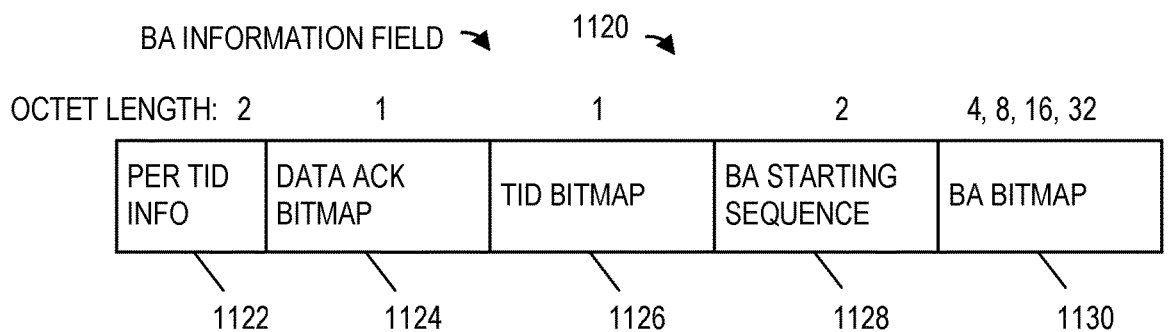
FIG. 11A, FIG. 11B, and FIG. 11C are diagrams of an example BA information field, a first example per TID information subfield, and a second example per TID information subfield, according to an embodiment.
Figure 11B:
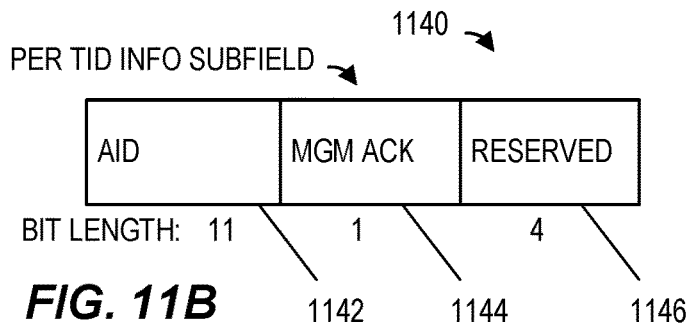
Figure 11C:
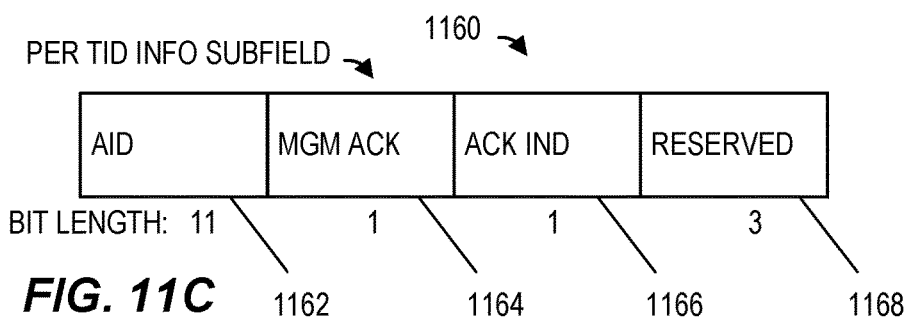

FIG. 11A, FIG. 11B, and FIG. 11C are diagrams of an example BA information field 1120, a first example per TID information subfield 1140, and a second example per TID information subfield 1160, according to an embodiment. The number below each field in FIG. 11B and FIG. 11C indicates the number of bits occupied by the corresponding subfield, according to an example embodiment. The number above each field in FIG. 11A indicates the number of octets occupied by the corresponding subfield, according to an example embodiment.

The AP 14 or client station 25 generates the MPDU 350 with the BA control field 800 and the BA information field 1120 as a broadcast frame which includes a multi-TID M-BA block acknowledgment for multiple stations or a unicast frame which includes a multi-TID M-BA block acknowledgment for a single station, in various embodiments and/or scenarios. The BA information field 1120 corresponds to the BA information field 354, in an embodiment. In the embodiment illustrated in FIG. 11A, the BA information field 1120 includes a per TID information subfield 1122 (2 octets), a data acknowledgment bitmap 1124 (1 octet), a TID bitmap 1126 (1 octet), zero, one, or multiple combinations of BA starting sequence control fields 1128 (2 octets), and Block Ack bitmap 1130 (variable number of octets).

The data Ack 1124 indicates single acknowledgments for single MPDUs belonging to a particular TID, in an embodiment. In an embodiment, for example, each bit of the data acknowledgment bitmap 1124 corresponds to one of TID0 to TID7 and indicates whether the MPDU of the corresponding TID is acknowledged (e.g., a value of "1" for an acknowledgment and a value of "0" for a negative acknowledgment).

The TID bitmap 1126 provides an indication for block acknowledgments, in an embodiment. In an embodiment, for example, each bit of the TID bitmap 1126 corresponds to a respective traffic identifier value (e.g., TID0 to TID7) and indicates whether a respective block acknowledgment starting sequence control field 1128 and block acknowledgment bitmap 1130 is present within the first acknowledgment information field for the corresponding traffic identifier value. In other words, a respective block acknowledgment starting sequence control field 1128 and block acknowledgment bitmap 1130 is provided for each traffic identifier value indicated by the TID bitmap 1126. The Block Ack starting sequence control field 1128 and the Block Ack bitmap 1130 generally correspond to the Block Ack starting sequence control field 1024 and the Block Ack bitmap 1026 of the BA information field 1020.

The per TID information subfield 1140 corresponds to the per TID information subfield 1122, in an embodiment. In the embodiment illustrated in FIG. 11B, the per TID information subfield 1140 includes a device identifier 1142 (11 bits), a management acknowledgment subfield 1144 (1 bit), and a reserved subfield 1146 (4 bits). The device identifier 1142 generally corresponds to the device identifier 952, in an embodiment. The management acknowledgment subfield 1144 generally corresponds to the management acknowledgment subfield 712, in an embodiment.

The per TID information subfield 1160 corresponds to the per TID information subfield 1122, in an embodiment. In the embodiment illustrated in FIG. 11C, the per TID information subfield 1160 includes a device identifier 1162 (11 bits), a management acknowledgment subfield 1164 (1 bit), an acknowledgment indication 1166 (1 bit), and a reserved subfield 1168 (3 bits). The device identifier 1162 and management acknowledgment subfield 1164 generally corresponds to the device identifier 1142 and the management acknowledgment subfield 1144, in an embodiment. The acknowledgment indication 1166 indicates whether the data acknowledgment bitmap 1124 is present, in some embodiments. In an embodiment, for example, a first value (e.g., "0") indicates that the MPDU 350 does not include single acknowledgments and that the data acknowledgment bitmap 1124 is omitted.

Figure 12A:
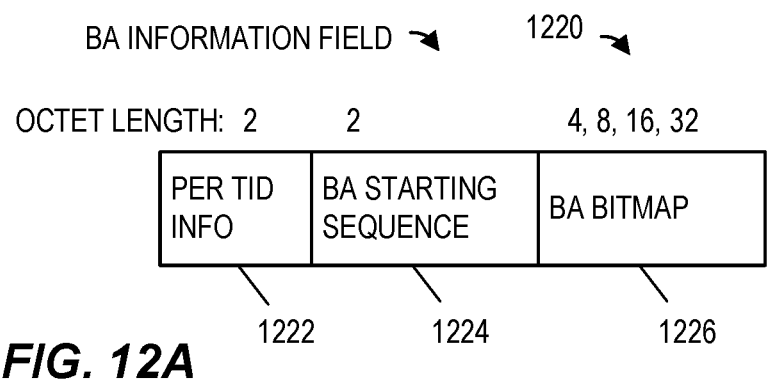
FIG. 12A and FIG. 12B are diagrams of an example BA information field and an example per TID information subfield, according to an embodiment.
Figure 12B:
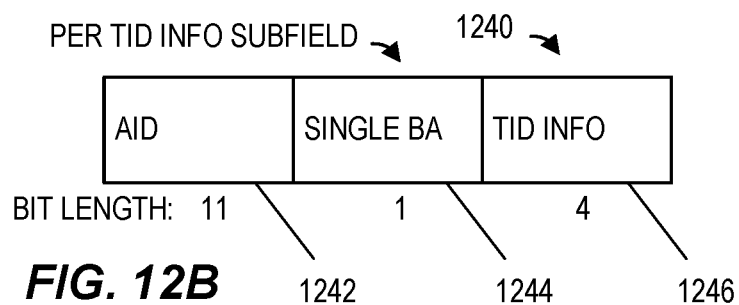
Figure 13A:
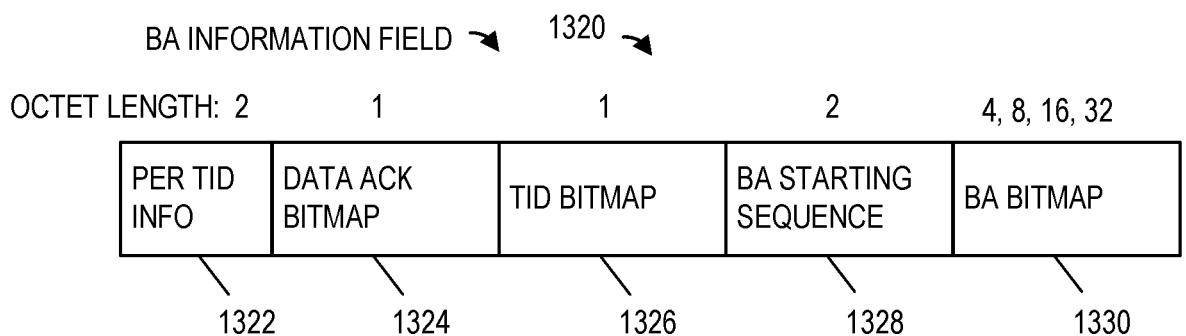
FIG. 13A and FIG. 13B are diagrams of an example BA information field and an example per TID information subfield, according to an embodiment.
Figure 13B:
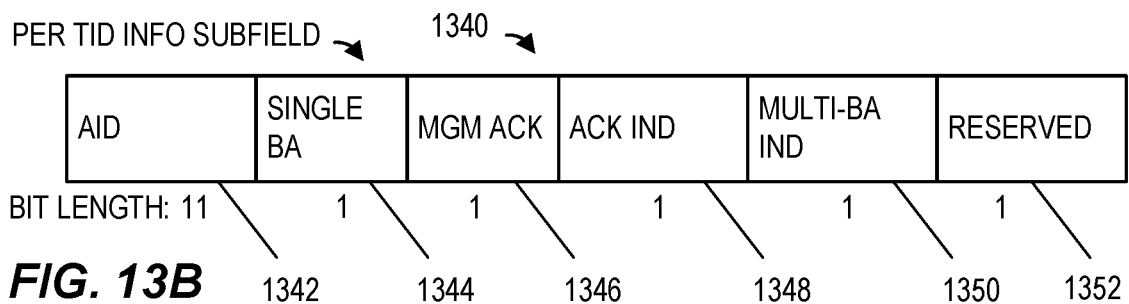

FIG. 12A and FIG. 12B are diagrams of an example BA information field 1220 and an example per TID information subfield 1240, according to an embodiment. FIG. 13A and FIG. 13B are diagrams of an example BA information field 1320 and an example per TID information subfield 1340, according to an embodiment. The number below each field in FIG. 12B and FIG. 13B indicates the number of bits occupied by the corresponding subfield, according to an example embodiment. The number above each field in FIG. 12A and FIG. 13A indicates the number of octets occupied by the corresponding subfield, according to an example embodiment.

The AP 14 or client station 25 generates the MPDU 350 with the BA control field 800 and the BA information field 1220 or the BA information field 1320 as a broadcast frame which includes a M-BA block acknowledgment for multiple stations or a unicast frame which includes a M-BA block acknowledgment for a single station, in various embodiments and/or scenarios. The BA information field 1220 and BA information field 1320 correspond to the BA information field 354, in an embodiment. In the embodiment illustrated in FIG. 12A, the BA information field 1220 includes a per TID information subfield 1222 (2 octets), a BA starting sequence control field 1224 (2 octets), and a Block Ack bitmap 1226 (variable number of octets). The BA starting sequence control field 1224 and the BA bitmap 1226 generally correspond to the BA starting sequence control field 924 and the BA bitmap 926 of the BA information field 920, in an embodiment.

The per TID information subfield 1240 corresponds to the per TID information subfield 1222, in an embodiment. In the embodiment illustrated in FIG. 12B, the per TID information subfield 1240 includes a device identifier 1242 (11 bits), a single block acknowledgment subfield 1244 (1 bit), and a TID value subfield 1246 (4 bits). The device identifier 1242 and the TID value subfield 1246 generally correspond to the device identifier 952 and the TID value subfield 956 of the per TID information field 950, in an embodiment.

The BA information field 1320 corresponds to the BA information field 354, in an embodiment. In the embodiment illustrated in FIG. 13A, the BA information field 1320 includes a per TID information subfield 1322 (2 octets), a data acknowledgment bitmap 1324 (1 octet), a TID bitmap 1326 (1 octet), a BA starting sequence control field 1328 (2 octets), and a Block Ack bitmap 1330 (variable number of octets). The per TID information subfield 1322, the data acknowledgment bitmap 1324, the TID bitmap 1326, the BA starting sequence control field 1328, and the Block Ack bitmap 1330 generally correspond to the per TID information subfield 1122, the data acknowledgment bitmap 1124, the TID bitmap 1126, the BA starting sequence control field 1128, and the Block Ack bitmap 1130 of the BA information field 1120, in an embodiment.

The per TID information subfield 1340 corresponds to the per TID information subfield 1322, in an embodiment. In the embodiment illustrated in FIG. 13B, the per TID information subfield 1340 includes a device identifier 1342 (11 bits), a single block acknowledgment subfield 1344 (1 bit), a management acknowledgment subfield 1346 (1 bit), an acknowledgment indication 1348 (1 bit), a multi-Block Ack indication 1350 (1 bit), and a reserved subfield 1352 (1 bit). The device identifier 1342, the single block acknowledgment subfield 1344, the management acknowledgment subfield 1346, and the acknowledgment indication 1348 correspond to the device identifier 1242, the single block acknowledgment subfield 1244, the management acknowledgment subfield 1144, and the acknowledgment indication 1166, in an embodiment. The multi-Block Ack indication 1350 indicates whether multiple block acknowledgment bitmaps are present, for example, whether the TID bitmap 1326, the Block Ack starting sequence control field 1328, and the block acknowledgment bitmap 1330 are present, in some embodiments. In an embodiment, for example, a first value (e.g., "0") indicates that the MPDU 350 does not include block acknowledgment for particular TIDs and that the TID bitmap 1326, the Block Ack starting sequence control field 1328, and the block acknowledgment bitmap 1330 are omitted.

The single block acknowledgment subfields 1244 and 1344 indicate the type or format of the corresponding per TID information subfield and BA information field, in various embodiments and/or scenarios. In an embodiment, for example, a first value (e.g., "0") corresponds to a single acknowledgment and indicates that the per TID information field 1240 and BA information field 1220 are utilized, and a second value (e.g., "1") corresponds to a block acknowledgment and indicates that the per TID information field 1340 and the BA information field 1320 are utilized.

Figure 14:
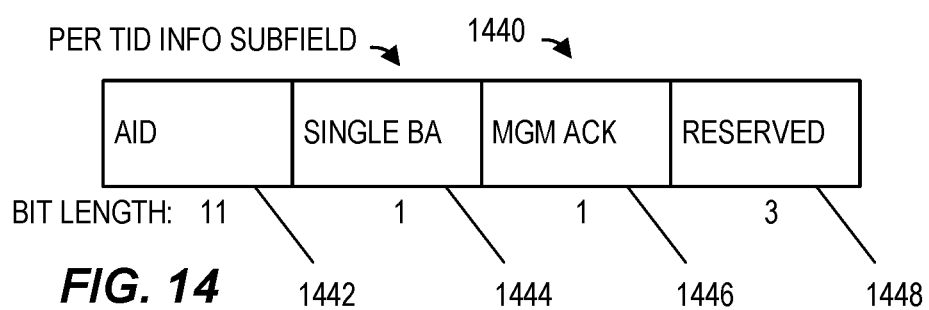
FIG. 14 is a diagram of an example per TID information subfield, according to an embodiment.
Figure 15A:
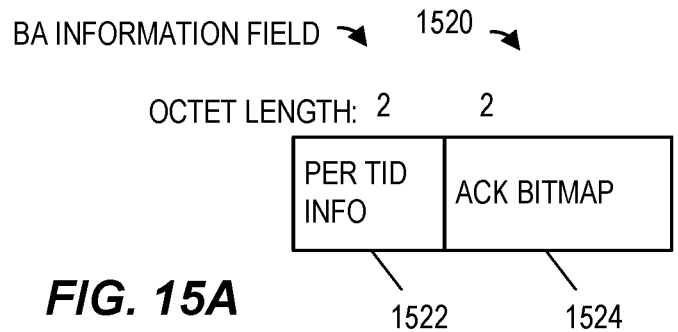
FIG. 15A, FIG. 15B, FIG. 15C, and FIG. 15D are diagrams of an example BA information field, an example per TID information subfield, an example BA information field, and an example per TID information subfield, according to an embodiment.
Figure 15B:
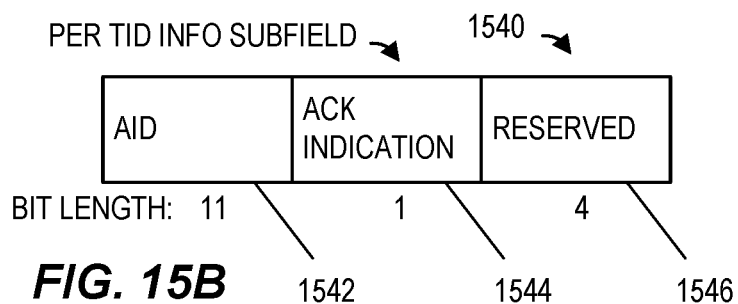
Figure 15C:
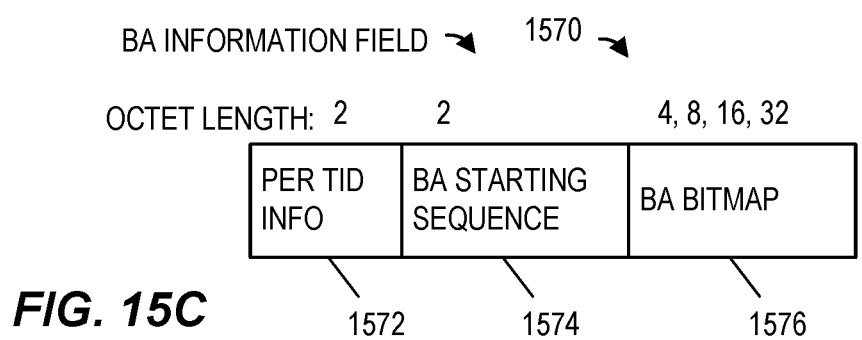
Figure 15D:
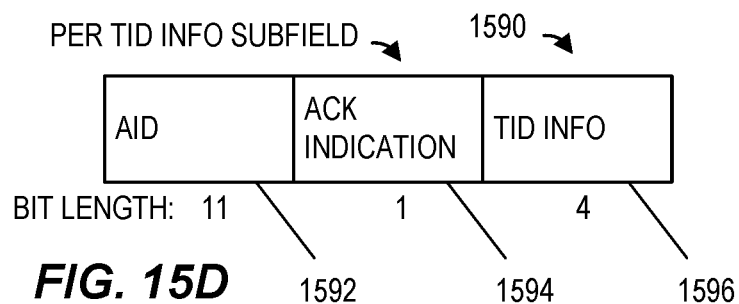

FIG. 14 is a diagram of an example per TID information subfield 1440, according to an embodiment. The number below each field in FIG. 14 indicates the number of bits occupied by the corresponding subfield, according to an example embodiment. The AP 14 or client station 25 generates the MPDU 350 with the BA control field 800 and the BA information field 1320 as a broadcast frame which includes a multi-TID M-BA block acknowledgment for multiple stations or a unicast frame which includes a multi-TID M-BA block acknowledgment for a single station, in various embodiments and/or scenarios.

The per TID information subfield 1440 corresponds to the per TID information subfield 1322, in an embodiment. In the embodiment illustrated in FIG. 14, the per TID information subfield 1440 includes a device identifier 1442 (11 bits), a single block acknowledgment subfield 1444 (1 bit), a management acknowledgment subfield 1446 (1 bit), and a reserved subfield 1448 (4 bits). The device identifier 1442 and the management acknowledgment subfield 1446 correspond to the device identifier 1242 and the management acknowledgment subfield 1144, in an embodiment. The single block acknowledgment subfield 1444 indicates whether the data acknowledgment bitmap 1324, the TID bitmap 1326, the BA starting sequence control field 1328, and the Block Ack bitmap 1330 are present within the BA information field 1320, in an embodiment.

FIG. 15A, FIG. 15B, FIG. 15C, and FIG. 15D are diagrams of an example BA information field 1520, an example per TID information subfield 1540, an example BA information field 1570, and an example per TID information subfield 1590, according to an embodiment. The number below each field in FIG. 15B and FIG. 15D indicates the number of bits occupied by the corresponding subfield, according to an example embodiment. The number above each field in FIG. 15A and FIG. 15C indicates the number of octets occupied by the corresponding subfield, according to an example embodiment.

The AP 14 or client station 25 generates the MPDU 350 with the BA control field 800 and the BA information field 1520 or the BA information field 1570 as a broadcast frame which includes a multi-TID M-BA block acknowledgment for multiple stations or a unicast frame which includes a multi-TID M-BA block acknowledgement for an single station, in various embodiments and/or scenarios. The BA information field 1520 corresponds to the BA information field 354, in an embodiment. In the embodiment illustrated in FIG. 15A, the BA information field 1520 includes a per TID information subfield 1522 (2 octets) and an acknowledgment bitmap 1524 (2 octets). The per TID information subfield 1540 corresponds to the per TID information subfield 1522, in an embodiment. In the embodiment illustrated in FIG. 15B, the per TID information subfield includes a device identifier 1542 (11 bits), an acknowledgment indication 1544 (1 bit), and a reserved subfield 1546 (4 bits). The device identifier 1542 corresponds to the device identifier 952, in an embodiment. Each bit of the acknowledgment bitmap 1524 indicates an acknowledgment for a respective TID, in an embodiment. In an embodiment, one bit (e.g., bit 15) of the acknowledgment bitmap 1524 indicates an acknowledgment of a management frame.

The BA information field 1570 corresponds to the BA information field 354, in an embodiment. In the embodiment illustrated in FIG. 15C, the BA information field 1540 includes a per TID information subfield 1572 (2 octets), a block acknowledgment starting sequence control field 1574 (2 octets), and a block acknowledgment bitmap 1576 (2 octets). The block acknowledgment starting sequence control field 1574 and the block acknowledgment bitmap 1576 generally correspond to the BA starting sequence control field 1128, and the Block Ack bitmap 1130, in an embodiment.

The per TID information subfield 1590 corresponds to the per TID information subfield 1572, in an embodiment. In the embodiment illustrated in FIG. 15D, the per TID information subfield includes a device identifier 1592 (11 bits), an acknowledgment indication 1594 (1 bit), and a TID value subfield 1596 (4 bits). The device identifier 1592 and the TID value subfield 1596 correspond to the device identifier 952 and the TID value subfield 956, in an embodiment.

The acknowledgment indication 1544 and 1594 indicate the type or format of the corresponding per TID information subfield and BA information field, in various embodiments and/or scenarios. In an embodiment, for example, a first value (e.g., "0") corresponds to a single acknowledgment and indicates that the per TID information field 1540 and BA information field 1520 are utilized, and a second value (e.g., "1") corresponds to a block acknowledgment and indicates that the per TID information field 1590 and the BA information field 1570 are utilized.

Figure 16A:
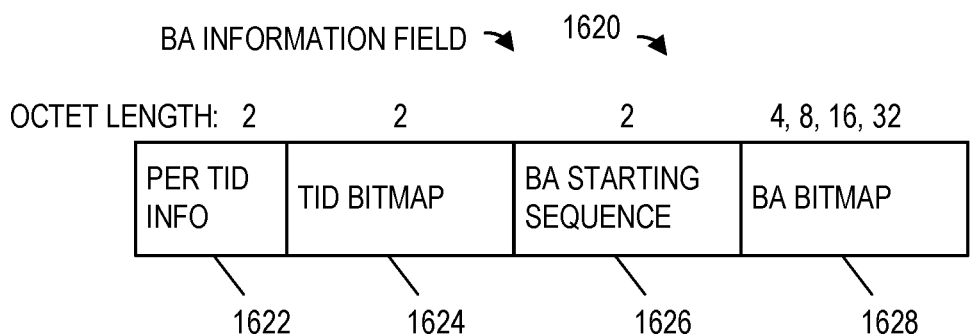
FIG. 16A and FIG. 16B are diagrams of an example BA information field and an example per TID information subfield, according to an embodiment.
Figure 16B:
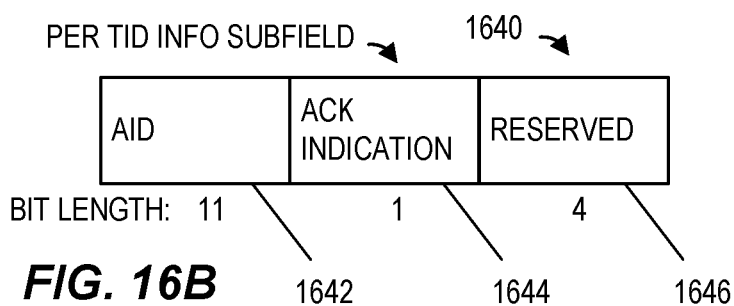

FIG. 16A and FIG. 16B are diagrams of an example BA information field 1620 and an example per TID information subfield 1640, according to an embodiment. The number below each field in FIG. 16B indicates the number of bits occupied by the corresponding subfield, according to an example embodiment. The number above each field in FIG. 16A indicates the number of octets occupied by the corresponding subfield, according to an example embodiment.

The AP 14 or client station 25 generates the MPDU 350 with the BA control field 800 and the BA information field 1620 as a broadcast frame which includes a multi-TID M-BA block acknowledgment for multiple stations or a unicast frame which includes a multi-TID M-BA block acknowledgement for a single station, in various embodiments and/or scenarios. The BA information field 1620 corresponds to the BA information field 354, in an embodiment. In the embodiment illustrated in FIG. 16A, the BA information field 1620 includes a per TID information subfield 1622 (2 octets), a TID bitmap 1624 (1 octet), a BA starting sequence control field 1626 (2 octets), and a Block Ack bitmap 1628 (variable number of octets). The TID bitmap 1624, the BA starting sequence control field 1626, and the Block Ack bitmap 1628 generally correspond to the TID bitmap 1126, the BA starting sequence control field 1128, and the Block Ack bitmap 1130 of the BA information field 1120, in an embodiment.

FIG. 17 is a flow diagram illustrating an example method 1700 for simultaneously communicating with multiple communication devices in a wireless local area network, according to an embodiment. In an embodiment, the method 1700 is implemented by a client station in the WLAN, according to an embodiment. With reference to FIG. 1, the method 1700 is implemented by the network interface 27, in an embodiment. For example, in one such embodiment, the PHY processor 29 is configured to implement the method 1700. According to another embodiment, the MAC processing 28 is also configured to implement at least a part of the method 1700. With continued reference to FIG. 1, in yet another embodiment, the method 1700 is implemented by the network interface 16 (e.g., the PHY processor 20 and/or the MAC processor 18). In other embodiments, the method 1700 is implemented by other suitable network interfaces.

At block 1702, multiple uplink data units simultaneously transmitted by multiple second communication devices are received at a first communication device, in an embodiment. The multiple uplink data units include a management data unit and a traffic data unit, in an embodiment. In an embodiment, for example, the AP 14 receives the OFDMA data unit 250 that includes MPDUs 300 from multiple client stations 25.

At block 1704, an acknowledgment data unit to acknowledge receipt of the multiple data units simultaneously transmitted by the multiple second communication devices is generated at the first communication device, in an embodiment. The acknowledgment data unit includes (i) an indication that indicates that the acknowledgment data unit is intended for the multiple second communication devices, and (ii) respective acknowledgment information fields for the multiple second communication devices, in an embodiment. The respective acknowledgment information fields include a first acknowledgment information field for the management data unit and a second acknowledgment information field for the traffic data unit, in an embodiment. In an embodiment, the AP 14 sets a receiver address 310-1 to a broadcast receiver address to indicate that the acknowledgment data unit is intended for the multiple second communication devices. The respective acknowledgment information fields include one or more of the BA information fields 420, 620, 720, 820, 920, 940, 1020, 1120, 1220, 1320, 1520, 1570, or 1620, in various embodiments and/or scenarios.

At block 1706, the acknowledgment data unit is caused to be transmitted from the first communication device to the multiple second communication devices, in an embodiment.

In another embodiment, the method 1700 is performed using single user PPDUs as follows.

At block 1702, an aggregate medium access control (MAC) protocol data unit (MPDU) A-MPDU that includes multiple data units is received at a first communication device from a second communication device. The multiple data units correspond to two or more traffic classes identified by different traffic identifiers. In an embodiment, the first communication device is the AP 14 and the second communication device is a client station 25. In another embodiment, the first communication device is the client station 25 and the second communication device is the AP 14.

At block 1704, an acknowledgment data unit is generated to acknowledge receipt of the multiple data units. The acknowledgment data unit includes (i) an indication that indicates that the acknowledgment data unit is intended for the second communication device, and (ii) respective acknowledgment information fields for the two or more traffic classes.

At block 1706, the acknowledgment data unit is caused to be transmitted from the first communication device to the second communication device.

FIG. 18 is a flow diagram illustrating an example method 1800 for communicating an acknowledgment policy for a data unit in a wireless local area network, according to an embodiment. In an embodiment, the method 1800 is implemented by a client station in the WLAN, according to an embodiment. With reference to FIG. 1, the method 1800 is implemented by the network interface 27, in an embodiment. For example, in one such embodiment, the PHY processor 29 is configured to implement the method 1800. According to another embodiment, the MAC processing 28 is also configured to implement at least a part of the method 1800. With continued reference to FIG. 1, in yet another embodiment, the method 1800 is implemented by the network interface 16 (e.g., the PHY processor 20 and/or the MAC processor 18). In other embodiments, the method 1800 is implemented by other suitable network interfaces.

At block 1802, a first medium access control (MAC) protocol data unit (MPDU) of an aggregate MPDU intended for a second communication device is generated at a first communication device. In an embodiment, for example, the AP 14 generates the MPDU 524.

At block 1804, an MPDU delimiter is generated for the first MPDU that indicates an acknowledgment policy for the first MPDU. In an embodiment, for example, the AP 14 generates the MPDU delimiter 522 and sets the EOF field 532 to indicate an acknowledgment policy, as described above with respect to FIG. 5A, FIG. 5B, and FIG. 5C. In an embodiment, the acknowledgment policy is a mandatory policy to be followed by the second communication device. In another embodiment, the acknowledgment policy is a recommended policy that may or may not be followed by the second communication device. In other words, the second communication device determines whether to follow the recommended policy for acknowledgment of the MPDU or to disregard the recommended policy.

At block 1806, generating, at the first communication device, the aggregate MPDU to include the MPDU delimiter and the first MPDU. In an embodiment, for example, the AP 14 generates the A-MPDU 500 to include the A-MPDU subframe 520.

At block 1808, the aggregate MPDU is caused to be transmitted from the first communication device to the second communication device.

FIG. 19 is a flow diagram illustrating an example method 1900 for simultaneously communicating with multiple communication devices in a wireless local area network, according to an embodiment. In an embodiment, the method 1900 is implemented by a client station in the WLAN, according to an embodiment. With reference to FIG. 1, the method 1900 is implemented by the network interface 27, in an embodiment. For example, in one such embodiment, the PHY processor 29 is configured to implement the method 1900. According to another embodiment, the MAC processing 28 is also configured to implement at least a part of the method 1900. With continued reference to FIG. 1, in yet another embodiment, the method 1900 is implemented by the network interface 16 (e.g., the PHY processor 20 and/or the MAC processor 18). In other embodiments, the method 1900 is implemented by other suitable network interfaces.

At block 1902, multiple uplink data units simultaneously transmitted by multiple second communication devices are received at a first communication device, in an embodiment. The multiple uplink data units include a plurality of traffic data units that is (i) from a second communication device of the multiple second communication devices, and (ii) includes traffic data units corresponding to multiple traffic identifiers. In an embodiment, for example, the AP 14 receives the OFDMA data unit 250 that includes MPDUs 300 from multiple client stations 25.

At block 1904, an acknowledgment data unit is generated at the first communication device to acknowledge receipt of the multiple data units simultaneously transmitted by the multiple second communication devices, in an embodiment. The acknowledgment data unit includes (i) an indication that indicates that the acknowledgment data unit is intended for the multiple second communication devices, and (ii) respective acknowledgment information fields for the multiple second communication devices, in an embodiment. The respective acknowledgment information fields include a first acknowledgment information field for the plurality of traffic data units, in an embodiment.

At block 1906, the acknowledgment data unit is caused to be transmitted from the first communication device to the multiple second communication devices, in an embodiment.

In another embodiment, the method 1900 is performed as follows.

At block 1902, multiple uplink data units simultaneously transmitted by multiple second communication devices are received. The multiple uplink data units include a plurality of traffic data units that is (i) from a second communication device of the multiple second communication devices, and (ii) includes traffic data units corresponding to multiple traffic identifier values.

At block 1904, an acknowledgment data unit is generated to acknowledge receipt of the multiple data units simultaneously transmitted by the multiple second communication devices. The acknowledgment data unit includes (i) an indication that indicates that the acknowledgment data unit is intended for the multiple second communication devices, and (ii) respective acknowledgment information fields for the multiple second communication devices. The respective acknowledgment information fields include a first acknowledgment information field for the plurality of traffic data units.

At block 1906, the acknowledgment data unit is caused to be transmitted from the first communication device to the multiple second communication devices.

In this embodiment, generating the acknowledgment data unit includes generating the first acknowledgment information field for the plurality of traffic data units to include, for each traffic identifier value of the multiple traffic identifier values to be acknowledged, (i) an identifier associated with the second communication device, (ii) an acknowledgment type indication, and (iii) the traffic identifier value to be acknowledged. the acknowledgment type indication has one or more bits set to one of a plurality of predetermined values including at least a first predetermined value and a second predetermined value. The first predetermined value indicates a normal acknowledgment of a single data unit for the corresponding traffic identifier value, and the second predetermined value indicates that a block acknowledgment bitmap follows the traffic identifier value to be acknowledged, where each bit of the block acknowledgment bitmap indicates an acknowledgment of a single data unit of the plurality of traffic data units having the corresponding traffic identifier value.

In various embodiments and scenarios, an initiating station transmits an A-MPDU having one or more MPDUs to a responding station and the responding station transmits an acknowledgment to the initiating station. In some scenarios, the responding station transmits a single acknowledgment, a block acknowledgment, a multi-TID M-BA block acknowledgment, a compressed block acknowledgment, or other suitable response. In some embodiments, frames (i.e., MPDUs) that request a single acknowledgment are included within an A-MPDU according to one or more aggregation rules.

In some scenarios, a responding station (e.g., client station 25 or AP 14) receives (e.g., successfully decodes) only one MPDU which asks for a single acknowledgment from a multi-TID A-MPDU having multiple MPDUs that ask for respective single acknowledgments. In an embodiment, the responding station, having decoded only the one MPDU, may assume that a single MPDU (i.e., a VHT single MPDU) was transmitted, instead of the multi-TID A-MPDU. For example, the AP 14 may transmit to the client 25-1 (the responding station) an A-MPDU having first and second MPDUs that each ask for a single acknowledgment, but due to interference or a decoding error, the client 25-1 successfully decodes only the first MPDU of the two MPDUs. In one scenario, the responding station provides a single acknowledgment for the first MPDU that was successfully decoded to the AP 14, but does not provide an acknowledgment for the second MPDU. In this scenario, the AP 14 receives the acknowledgment for the first MPDU, but cannot readily determine whether the acknowledgment corresponds to the first MPDU or the second MPDU of the multi-TID A-MPDU. More specifically, a single acknowledgment frame generally includes a frame control field, a duration field, and a receiver address, but does not include an identification of a particular frame that is being acknowledged. In some scenarios where the AP 14 transmits the multi-TID A-MPDU via a downlink multi-user data unit (i.e., an OFDMA data unit and/or MU-MIMO data unit), if the receiving station does not support receiving uplink scheduling information in a MAC header, the responding station is not able to provide a single acknowledgment.

Figure 20:
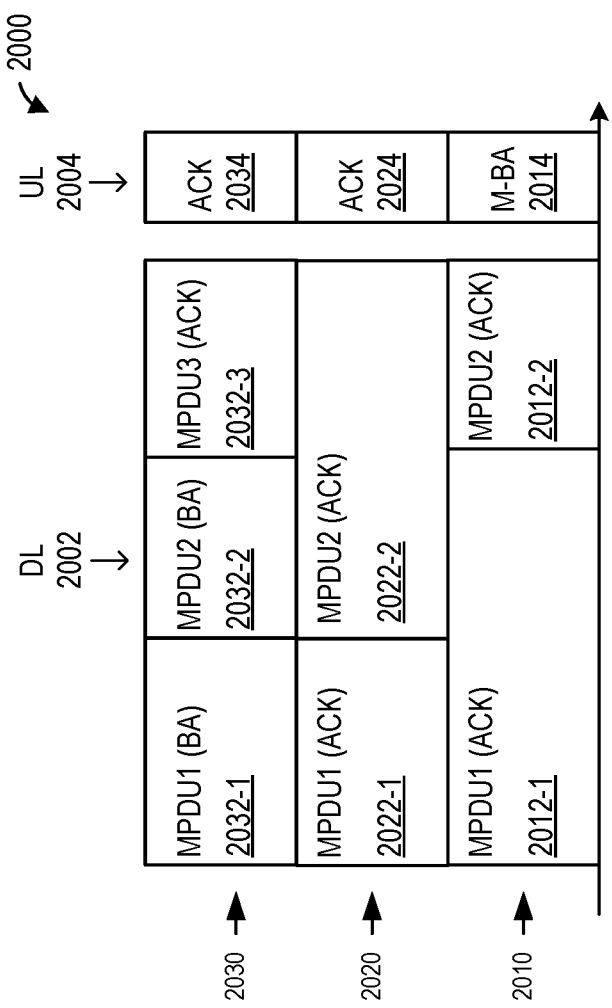
FIG. 20 is a diagram of an example frame exchange between an access point and a plurality of client stations and illustrates frames that request a single acknowledgment in various embodiments.

FIG. 20 is a diagram of an example frame exchange 2000 between an access point 14 and a plurality of client stations 25, according to an embodiment. In the embodiment shown in FIG. 20, the frame exchange 2000 is a multi-user (MU) frame exchange that utilizes OFDMA data units. The frame exchange 2000 includes physical layer (PHY) protocol data units (PPDUs) that include a first downlink (DL) OFDMA data unit 2002 and a second uplink (UL) OFDMA data unit 2004. In the embodiment shown in FIG. 20, some PHY fields (e.g., preamble fields, etc.) are not shown for clarity. In the embodiment shown in FIG. 20, the OFDMA data units 2002 and 2004 are transmitted over an OFDMA channel having three sub-channels 2010, 2020, and 2030 that are assigned or allocated to first, second, and third client stations 25-1, 25-2, and 25-3, respectively, for transmission of PPDUs. In some embodiments, the sub-channels 2010, 2020, and 2030 conform to an IEEE 802.11 communication protocol and occupy respective 20 MHz bandwidths. In other embodiments, the sub-channels 2010, 2020, and 2030 occupy other suitable bandwidths such as 2 MHz, 5 MHz, 10 MHz, 40 MHz, 80 MHz, 160 MHz, 320 MHz, 640 MHz, etc., for example, or other suitable bandwidths. While three sub-channels are shown, one, two, four, or more sub-channels are utilized, in other embodiments and/or scenarios. Although the embodiment shown in FIG. 20 utilizes a particular arrangement of MPDUs, other embodiments and/or scenarios utilize different arrangements according to data transfer needs of the originator and recipients, available network resources, etc. In other embodiments, the sub-channels 2010, 2020, and/or 2030 are spatial streams of a multi-user multiple input, multiple output (MU-MIMO) communication channel.

The AP 14 is configured to transmit the OFDMA data units 2002 to the client stations 25 via OFDM modulation and the client stations 25 are configured to transmit the OFDMA data unit 2004 (or a portion thereof on an assigned sub-channel or spatial stream) to the AP 14, in an embodiment. In the embodiment shown in FIG. 20, the DL OFDMA data unit 2002 includes a first PPDU 2012 on the first sub-channel 2010, a second PPDU 2022 on the second sub-channel 2020, and a third PPDU 2032 on the third sub-channel 2030, etc. In an embodiment, padding (e.g., zero-padding) within one or more of the PPDUs (e.g., PPDUs 2012, 2014, 2022, 2024, 2032, 2034) is used to equalize the lengths of the PPDUs within an OFDMA data unit, and to synchronize transmission of acknowledgment frames corresponding to the OFDMA data units 2002.

The AP 14 transmits the first PPDU 2012 including an A-MPDU with a first MPDU 2012-1 and a second MPDU 2012-2 according to an aggregation rule. In an embodiment, the first PPDU 2012, according to the aggregation rule, includes multiple frames (e.g., MPDUs) from different TIDs for the client station 25-1 where each of the multiple frames includes a request for a single acknowledgment ("ACK", e.g., an indication of an acknowledgment for a single MPDU belonging to a single TID). In other words, the first PPDU 2012 is a multi-TID A-MPDU having multiple frames request a single acknowledgment. In an embodiment, the multiple frames include at most one action frame. In various embodiments, the action frame is a spectrum management action frame, a QoS action frame (e.g., ADDTS Request, ADDTS Response), Block Acknowledgment action frame (e.g., ADDBA Request, ADDBA Response), Radio Measurement action frame (e.g., radio measurement request, radio measurement report), or other suitable action frame. In an embodiment, the multiple frames includes at most one MPDU from a single traffic class, in other words, no two frames of the multiple frames has a same value for a traffic class (TC), traffic indicator (TID), access category (AC), or other suitable indicator of packet priority.

In the embodiment shown in FIG. 20, the first PPDU 2012 includes the MPDU1 2012-1 and the MPDU2 2012-2 that both ask for a single acknowledgment (ACK). The first PPDU 2012 is transmitted by the AP 14 to the first client station 25-1 and successfully decoded. In an embodiment, the first client station 25-1 generates a multi-TID M-BA block acknowledgment (M-BA) 2014 in response to successfully decoding both the MPDU1 2012-1 and the MPDU2 2012-2. In the embodiment shown in FIG. 20, the second PPDU 2022 includes the MPDU1 2022-1 and the MPDU2 2022-2 that both ask for a single acknowledgment (ACK). The second PPDU 2012 is transmitted by the AP 14 to the second client station 25-2, but only the MPDU1 2022-1 is properly received and successfully decoded, while the MPDU 2022-2 is not properly received (e.g., the MPDU 2022-2 is corrupted). In an embodiment, the second client station 25-2 responds to the second PPDU 2022 with only a single acknowledgment 2024 corresponding to the MPDU1 2022-1, however, the single acknowledgment 2024 does not include an indication of which MPDU is being acknowledged (i.e., whether the MPDU1 2022-1 is being acknowledged or the MPDU 2022-2 is being acknowledged).

In another embodiment, according to another aggregation rule, in a multi-TID A-MPDU transmitted, the initiating station includes at most one MPDU having a request for a single acknowledgment frame. In an embodiment, the initiating station positions the MPDU asking for the single acknowledgment in the last subframe of the A-MPDU and the corresponding MPDU delimiter has a non-zero value in its Length field 536 and a value of 1 in its EoF field 532. In the embodiment of FIG. 20, for example, the PPDU 2032 includes an A-MPDU 2032 having a single MPDU 2032-3 that requests a single acknowledgment 2034 and MPDUs 2032-1 and 2032-2 that are acknowledged with a subsequent block acknowledgment (not shown), for example, according to a prior block acknowledgment agreement. In an embodiment, the single MPDU 2032-3 that requests the single acknowledgment is a QoS data frame or an Action frame.

In yet another embodiment, according to an aggregation rule, in a multi-TID A-MPDU, the initiating station includes only QoS Data MPDUs from TIDs with an existing block acknowledgment agreement with corresponding requests for a block acknowledgment and includes a QoS Data MPDU from a TID without a block acknowledgment agreement as the single MPDU that requests the single acknowledgment.

In another embodiment, according to another aggregation rule, the initiating station sets the reserve bit 534 in the MPDU delimiter 530 to indicate whether a corresponding MPDU in the multi-TID A-MPDU asks for a single acknowledgment. In this embodiment, if only one MPDU in the A-MPDU is properly received by the responding station, and the MPDU delimiter 530 of the MPDU has a value of 1 in its reserved bit 534, the responding client station can only respond with a multi-TID M-BA block acknowledgment (M-BA).

In various embodiments and scenarios, the responding station responds to a received A-MPDU (or portion thereof) according to one or more acknowledgment rules. In an embodiment, in response to a multi-TID A-MPDU having multiple MPDUs that request a single acknowledgment where only one of the multiple MPDUs is properly received, a responding station provides a single acknowledgment frame (i.e., without providing an acknowledgment of other MPDUs of the multi-TID A-MPDU). In another embodiment, the responding station responds with a multi-TID M-BA block acknowledgment.

In the embodiment and scenario shown in FIG. 20, the AP 14 (initiating station) transmits the A-MPDU having two MPDUs that each request a single acknowledgment frame (MPDU1 2022-1 and MPDU2 2022-2) to the second client station 25-2 (responding station). In this scenario, the second client station 25-2 correctly receives only one of the MPDUs and provides the single acknowledgment frame 2024 to the AP 14 (initiating station) according to an acknowledgment rule. In this embodiment, the AP 14 disregards the single acknowledgment frame because, as discussed above, the single acknowledgment frame does not include an indication of which MPDU is being acknowledged. In another embodiment, if only one MPDU which ask for a single acknowledgment in a multi-TID A-MPDU is received correctly, the responding STA responds with the single acknowledgment and a multi-TID M-BA block acknowledgment that corresponds to the remaining MPDUs.

Figure 21:
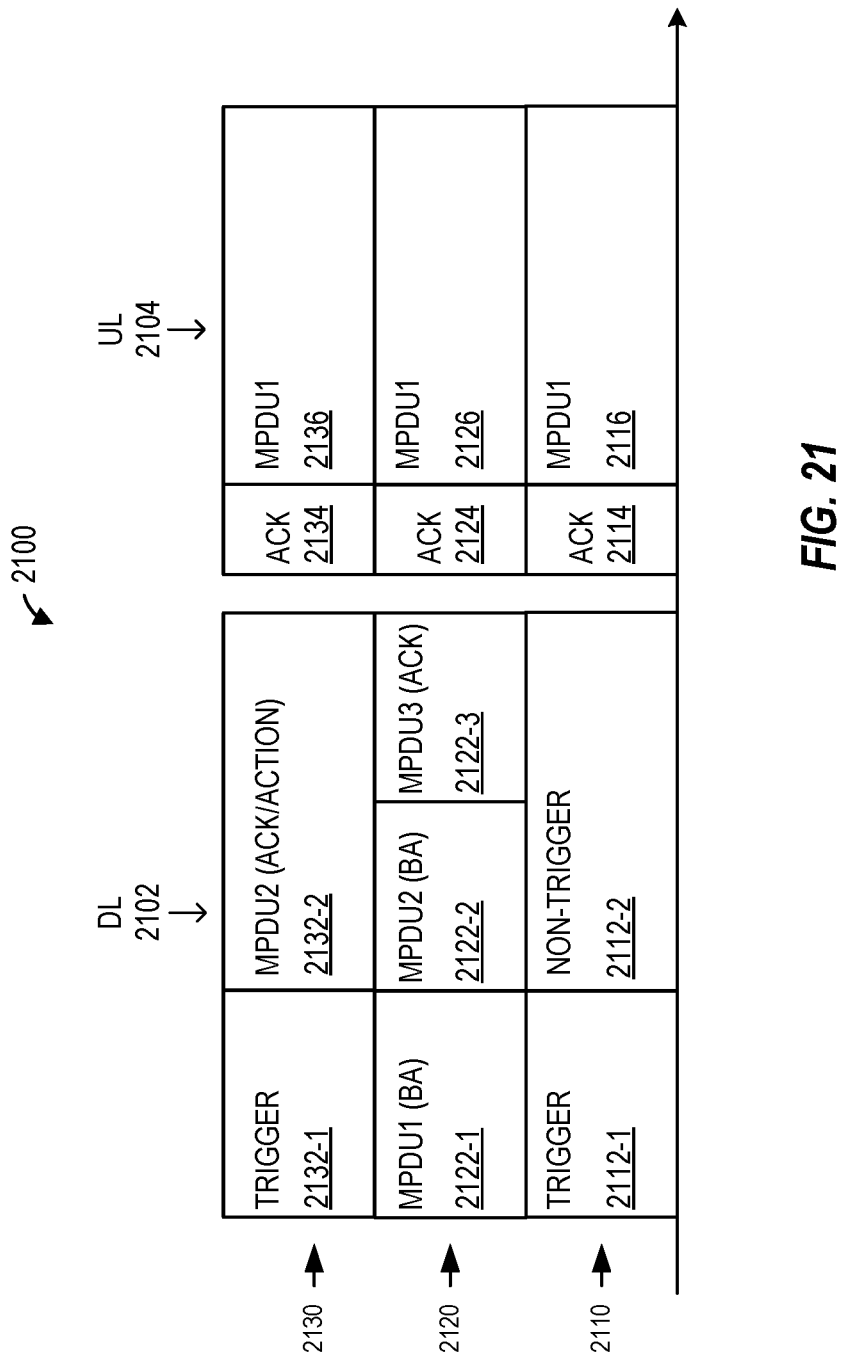
FIG. 21 is a diagram of an example frame exchange between an access point and a plurality of client stations and illustrates trigger frames with non-trigger frames, in various embodiments.

FIG. 21 is a diagram of an example frame exchange 2100 between an access point 14 and a plurality of client stations 25, according to an embodiment. In various embodiments and/or scenarios, the AP 14 generates a downlink multi-user data unit that includes an A-MPDU having a trigger frame and a non-trigger frame for a client station 25. The trigger frame provides a transmission schedule for a subsequent transmission by the client station 25, while the non-trigger frame provides QoS data, management information, control information, or other suitable information to the client station 25, in various embodiments. In an embodiment, the trigger frame is a control frame having a Trigger frame format. In another embodiment, the trigger frame is a QoS Null frame or other suitable frame having trigger scheduling information in a high efficiency (HE) variant HE Control field.

In the embodiment shown in FIG. 21, the frame exchange 2100 is a multi-user (MU) frame exchange, similar to the frame exchange 2100. The frame exchange 2100 includes a first DL OFDMA data unit 2102 and a second UL OFDMA data unit 2104 that are transmitted over sub-channels 2110, 2120, and 2130. The DL OFDMA data unit 2102 includes a first PPDU 2112 on the first sub-channel 2110, a second PPDU 2122 on the second sub-channel 2120, and a third PPDU 2132 on the third sub-channel 2130.

The first PPDU 2112 includes a trigger frame 2112-1 and a non-trigger frame 2112-2. In an embodiment, the non-trigger frame 2112-2 is a single QoS data frame that asks for a single acknowledgment frame. In another embodiment, the non-trigger frame 2112-2 is an action frame that asks for a single acknowledgment frame. In yet another embodiment, the non-trigger frame 2112-2 is a management frame that asks for a single acknowledgment frame. In another embodiment, the trigger frame 2112-1 is a QoS Null frame, for example, the QoS Null functions as a trigger frame in that it includes an indication of radio resources for the responding station to use. In the above-described embodiments of the first PPDU 2112, the PPDU 2112 is an "ACK enabled single-TID A-MPDU" and the responding station (i.e., the client station 25 for a downstream data unit or the AP 14 for an upstream data unit) announces support to receive the ACK enabled single-TID A-MPDU to an initiating station in a corresponding flag of an HE Capabilities element.

In an embodiment, the AP 14 generates an A-MPDU having i) a plurality of MPDUs from a TID with a block acknowledgment agreement, and ii) an MPDU that requests a single acknowledgment frame. In an embodiment, for example, the AP 14 generates the second PPDU 2122 that includes i) a plurality of MPDUs (including MPDU 2122-1 and MPDU 2122-2) having a same TID and that request a block acknowledgment, and ii) an MPDU 2122-3 that requests a single acknowledgment. The A-MPDU 2122 is an "ACK enabled multi-TID A-MPDU" and the responding station announces support to receive the ACK enabled multi-TID A-MPDU to an initiating station in a corresponding flag of the HE Capabilities element. In an embodiment, a responding station announces support to receive both the ACK enabled single-TID A-MPDU and the ACK enabled multi-TID A-MPDU via separate flags of the HE Capabilities element.

In the embodiment shown in FIG. 21, the AP 14 transmits the third PPDU 2132 to the client station 25-3, where the third PPDU 2132 includes an A-MPDU having a trigger frame 2132-1 and an Action frame 2132-2 that asks for a single acknowledgment. In this embodiment, the trigger frame 2132-1 provides scheduling information to be used by the client station 25-3 for transmission of the single acknowledgment to the Action frame 2132-2. In some scenarios, the client station 25-3 receives only the action frame 2132-2 and thus cannot determine whether a single user PPDU (i.e., a non-HT, HT, VHT, or HE SU PPDU) or a trigger-based PPDU should be used to send the single acknowledgment. In some scenarios, the client station 25-3 transmits an A-MPDU similar to the A-MPDU 2132 (e.g., an A-MPDU that includes a QoS Null data frame as a trigger frame and an action frame that requests a single acknowledgment) to the AP 14, but the AP 14 receives only the action frame and thus cannot determine whether a single user PPDU or trigger-based PPDU should be used to send the acknowledgment. In an embodiment, a responding station is configured to transmit a single acknowledgment frame for an action frame received from a client station (e.g., via an A-MPDU having a QoS Null data frame) through a single user PPDU, while the responding station is configured to transmit the single acknowledgment frame for an action frame received from an access point (e.g., via an A-MPDU having a trigger frame) through a trigger-based PPDU. In this embodiment, if a responding station receives an action frame in a MU PPDU without receiving corresponding scheduling information (e.g., via the trigger frame or QoS Null data frame), then the responding station does not respond with an acknowledgment frame, even when the action frame is properly received.

FIG. 22 is a flow diagram of an example method 2200 for communicating an acknowledgment policy for a data unit in a wireless local area network, according to an embodiment. In an embodiment, the method 2200 is implemented by a client station in the WLAN, according to an embodiment. With reference to FIG. 1, the method 2200 is implemented by the network interface 27, in an embodiment. For example, in one such embodiment, the PHY processor 29 is configured to implement the method 2200. According to another embodiment, the MAC processing 28 is also configured to implement at least a part of the method 2200. With continued reference to FIG. 1, in yet another embodiment, the method 2200 is implemented by the network interface 16 (e.g., the PHY processor 20 and/or the MAC processor 18). In other embodiments, the method 2200 is implemented by other suitable network interfaces.

At block 2202, a plurality of medium access control (MAC) protocol data units (MPDUs) of an aggregate MPDU intended for a second communication device are generated by a first communication device. In an embodiment, the first communication device is the AP 14, the second communication device is a client station, and the A-MPDU is one of the A-MPDUs 2012, 2022, or 2032.

At block 2204, a plurality of MPDU delimiters are generated at the first communication device. Each MPDU delimiter of the plurality of MPDU delimiters indicates an acknowledgment policy for a corresponding MPDU of the plurality of MPDUs. At least two MPDUs of the plurality of MPDUs correspond to MPDU delimiters that indicate an acknowledgment policy corresponding to a single acknowledgment frame for the corresponding MPDUs. In an embodiment, the acknowledgment policy is a mandatory policy to be followed by the second communication device. In another embodiment, the acknowledgment policy is a recommended policy that may or may not be followed by the second communication device. In other words, the second communication device determines whether to follow the recommended policy for acknowledgment or to disregard the recommended policy.

At block 2206, the aggregate MPDU is generated at the first communication device to include the plurality of MPDUs and the plurality of MPDU delimiters.

At block 2208, the aggregate MPDU is caused to be transmitted from the first communication device to the second communication device.

FIG. 23 is a flow diagram of an example method 2300 for communicating an acknowledgment policy for a data unit in a wireless local area network, according to an embodiment. In an embodiment, the method 2300 is implemented by a client station in the WLAN, according to an embodiment. With reference to FIG. 1, the method 2300 is implemented by the network interface 27, in an embodiment. For example, in one such embodiment, the PHY processor 29 is configured to implement the method 2300. According to another embodiment, the MAC processing 28 is also configured to implement at least a part of the method 2300. With continued reference to FIG. 1, in yet another embodiment, the method 2300 is implemented by the network interface 16 (e.g., the PHY processor 20 and/or the MAC processor 18). In other embodiments, the method 2300 is implemented by other suitable network interfaces.

At block 2302, a plurality of medium access control (MAC) protocol data units (MPDUs) of an aggregate MPDU intended for a second communication device are generated at a first communication device. The plurality of MPDUs include i) a trigger frame, and ii) a non-trigger frame having an acknowledgment policy to be followed by the second communication device and corresponding to a single acknowledgment frame. The trigger frame includes an indication of radio resources allocated for the single acknowledgment frame to the non-trigger frame. In an embodiment, the first communication device is the AP 14, the second communication device is a client station, and the A-MPDU is one of the A-MPDUs 2112, 2122, or 2132.

At block 2304, the aggregate MPDU is generated at the first communication device to include the plurality of MPDUs and the plurality of MPDU delimiters.

At block 2306, the aggregate MPDU is caused to be transmitted from the first communication device to the second communication device.

FIG. 24 is a flow diagram of an example method 2400 of acknowledging data units in a wireless local area network, according to an embodiment. In an embodiment, the method 2400 is implemented by a client station in the WLAN, according to an embodiment. With reference to FIG. 1, the method 2300 is implemented by the network interface 27, in an embodiment. For example, in one such embodiment, the PHY processor 29 is configured to implement the method 2300. According to another embodiment, the MAC processing 28 is also configured to implement at least a part of the method 2300. With continued reference to FIG. 1, in yet another embodiment, the method 2300 is implemented by the network interface 16 (e.g., the PHY processor 20 and/or the MAC processor 18). In other embodiments, the method 2300 is implemented by other suitable network interfaces.

At block 2402, an aggregate medium access control (MAC) protocol data unit (MPDU) A-MPDU that includes multiple data units is received at a first communication device and from a second communication device. The multiple data units include i) a trigger frame, and ii) a non-trigger frame having an acknowledgment policy to be followed by the first communication device and corresponding to a single acknowledgment frame. The trigger frame includes an indication of radio resources allocated for the single acknowledgment frame. In an embodiment, the first communication device is the client station 25, the second communication device is the AP 14, and the A-MPDU is one of the A-MPDUs 2012, 2022, or 2032.

At block 2404, the single acknowledgment frame is generated at the first communication device to acknowledge receipt of the non-trigger frame.

At block 2406, the single acknowledgment frame is caused to be transmitted from the first communication device to the second communication device via the allocated radio resources.

Further aspects of the present invention relate to one or more of the following clauses.

In an embodiment, a method for simultaneously communicating with multiple communication devices in a wireless local area network includes: receiving, at a first communication device, multiple uplink data units simultaneously transmitted by multiple second communication devices, wherein the multiple uplink data units include a management data unit and a traffic data unit; generating, at the first communication device, an acknowledgment data unit to acknowledge receipt of the multiple data units simultaneously transmitted by the multiple second communication devices, wherein the acknowledgment data unit includes (i) an indication that indicates that the acknowledgment data unit is intended for the multiple second communication devices, and (ii) respective acknowledgment information fields for the multiple second communication devices, wherein the respective acknowledgment information fields include a first acknowledgment information field for the management data unit and a second acknowledgment information field for the traffic data unit; and causing the acknowledgment data unit to be transmitted from the first communication device to the multiple second communication devices.

In other embodiments, the method includes any suitable combination of one or more of the following features.

In an embodiment, each of the respective acknowledgment information fields includes (i) a respective identifier associated with a second communication device of the multiple second communication devices for which the respective acknowledgment information field is intended, (ii) a respective traffic identifier corresponding to uplink data units of the multiple uplink data units being acknowledged by the respective acknowledgment information field, and (iii) a respective acknowledgment type indication having one or more bits set to one of a plurality of predetermined values including at least a first predetermined value and a second predetermined value. In an embodiment, the first predetermined value indicates that the acknowledgment data unit includes an acknowledgment that acknowledges a single data unit received from the second communication device and the second predetermined value indicates that the acknowledgment data unit includes a block acknowledgment that acknowledges multiple data units received from the second communication device.

In an embodiment, generating the acknowledgment data unit includes setting the traffic identifier of the first acknowledgment information field for the management data unit to a predetermined value reserved for management data units. In an embodiment, for example, the AP 14 sets a TID value to a predetermined value (e.g., a value greater than 7, a value of 15, or other suitable value).

In an embodiment, generating the acknowledgment data unit includes generating the second acknowledgment information field to include (i) an acknowledgment type indication set to the second predetermined value, (ii) a block acknowledgment bitmap having a variable length, and (iii) a bitmap length indication that indicates the length of the block acknowledgment bitmap, wherein each bit of the block acknowledgment bitmap indicates an acknowledgment of a single data unit of the multiple uplink data units. In an embodiment, the acknowledgment type indication corresponds to the ACK/BA subfield 1044 set to a value corresponding to the BA information field 1020. In this embodiment, the block acknowledgment bitmap corresponds to the block acknowledgment bitmap 1026 having a length indicated by the BA bitmap length 1052.

In an embodiment, generating the acknowledgment data unit includes generating at least two of the respective acknowledgment information fields that have (i) a same value of the identifier associated with the second communication device, and (ii) different values of the traffic identifier corresponding to the uplink data units of the multiple uplink data units being acknowledged by the respective acknowledgment information field.

In an embodiment, the at least two of the respective acknowledgment information fields include the first acknowledgment information field for the management data unit and the second acknowledgment information field for the traffic data unit.

In an embodiment, the first acknowledgment information field for the management data unit includes a management acknowledgment field that indicates whether the management data unit was successfully received.

In an embodiment, a first communication device that simultaneously communicates with multiple communication devices in a wireless local area network, the first communication device includes: a network interface device having one or more integrated circuits configured to receive multiple uplink data units simultaneously transmitted by multiple second communication devices, wherein the multiple uplink data units include a management data unit and a traffic data unit, generate an acknowledgment data unit to acknowledge receipt of the multiple data units simultaneously transmitted by the multiple second communication devices, wherein the acknowledgment data unit includes (i) an indication that indicates that the acknowledgment data unit is intended for the multiple second communication devices, and (ii) respective acknowledgment information fields for the multiple second communication devices, wherein the respective acknowledgment information fields include a first acknowledgment information field for the management data unit and a second acknowledgment information field for the traffic data unit, and cause the acknowledgment data unit to be transmitted from the first communication device to the multiple second communication devices.

In other embodiments, the first communication device includes any suitable combination of one or more of the following features.

Each of the respective acknowledgment information fields includes (i) a respective identifier associated with a second communication device of the multiple second communication devices for which the respective acknowledgment information field is intended, (ii) a respective traffic identifier corresponding to uplink data units of the multiple uplink data units being acknowledged by the respective acknowledgment information field, and (iii) a respective acknowledgment type indication having one or more bits set to one of a plurality of predetermined values including at least a first predetermined value and a second predetermined value, the first predetermined value indicates that the acknowledgment data unit includes an acknowledgment that acknowledges a single data unit received from the second communication device, and the second predetermined value indicates that the acknowledgment data unit includes a block acknowledgment that acknowledges multiple data units received from the second communication device.

The one or more integrated circuits are configured to set the traffic identifier of the first acknowledgment information field for the management data unit to a predetermined value reserved for management data units.

The one or more integrated circuits are configured to generate the second acknowledgment information field to include (i) an acknowledgment type indication set to the second predetermined value, (ii) a block acknowledgment bitmap having a variable length, and (iii) a bitmap length indication that indicates the length of the block acknowledgment bitmap, and each bit of the block acknowledgment bitmap indicates an acknowledgment of a single data unit of the multiple uplink data units.

In an embodiment, a method for communicating an acknowledgment policy for a data unit in a wireless local area network includes: generating, at a first communication device, a first medium access control (MAC) protocol data unit (MPDU) of an aggregate MPDU intended for a second communication device; generating, at the first communication device, an MPDU delimiter for the first MPDU that indicates an acknowledgment policy for the first MPDU to be followed by the second communication device; generating, at the first communication device, the aggregate MPDU to include the MPDU delimiter, the first MPDU, and one or more second MPDUs; causing the aggregate MPDU to be transmitted from the first communication device to the second communication device.

In other embodiments, the method includes any suitable combination of one or more of the following features.

In an embodiment, generating the MPDU delimiter includes generating an end of frame field of the MPDU delimiter having one or more bits set to one of a plurality of predetermined values including at least a first predetermined value and a second predetermined value. The first predetermined value indicates a normal acknowledgment policy to acknowledge a single data unit to be transmitted to the second communication device. The second predetermined value indicates a block acknowledgment policy to acknowledge multiple data units to be transmitted to the second communication device.

In an embodiment, the method also includes setting the end of frame field to the second predetermined value. Generating the first MPDU includes setting an acknowledgment policy field of a quality of service (QoS) control field of the first MPDU to a value that indicates an immediate block acknowledgment or a delayed block acknowledgment policy.

In an embodiment, generating the MPDU delimiter for the first MPDU includes setting i) an end of frame field of the MPDU delimiter for the first MPDU to a predetermined value that indicates a normal acknowledgment policy to acknowledge a single data unit, and ii) an MPDU length field of the MPDU delimiter for the first MPDU to a non-zero value; generating the first MPDU includes setting an acknowledgment policy field of a quality of service (QoS) control field of the first MPDU to a predetermined value that indicates an immediate block acknowledgment; and the predetermined value of the end of frame field for the first MPDU, the non-zero value of the MPDU length field for the first MPDU, and the predetermined value of the acknowledgment policy field for the first MPDU indicate that the first MPDU requests an Ack.

In an embodiment, the one or more second MPDUs include normal acknowledgment MPDUs that correspond to a normal acknowledgment policy; the normal acknowledgment MPDUs have respective traffic identifiers selected from a predetermined set of traffic identifiers; and for each traffic identifier of the predetermined set of traffic identifiers, the normal acknowledgment MPDUs include at most one MPDU having the traffic identifier.

In an embodiment, a method for simultaneously communicating with multiple communication devices in a wireless local area network includes: receiving, at a first communication device, multiple uplink data units simultaneously transmitted by multiple second communication devices, wherein the multiple uplink data units include a plurality of traffic data units that is (i) from a second communication device of the multiple second communication devices, and (ii) includes traffic data units corresponding to multiple traffic identifiers; generating, at the first communication device, an acknowledgment data unit to acknowledge receipt of the multiple data units simultaneously transmitted by the multiple second communication devices, wherein the acknowledgment data unit includes (i) an indication that indicates that the acknowledgment data unit is intended for the multiple second communication devices, and (ii) respective acknowledgment information fields for the multiple second communication devices, wherein the respective acknowledgment information fields include a first acknowledgment information field for the plurality of traffic data units; and causing the acknowledgment data unit to be transmitted from the first communication device to the multiple second communication devices. Generating the acknowledgment data unit includes generating the first acknowledgment information field for the plurality of traffic data units to include (i) an identifier associated with the second communication device, (ii) a traffic identifier bitmap, and (iii) one or more block acknowledgment bitmaps, each bit of the traffic identifier bitmap corresponds to a respective traffic identifier value and indicates whether a respective block acknowledgment bitmap of the one or more block acknowledgment bitmaps is present within the first acknowledgment information field for the corresponding traffic identifier value, and each bit of a block acknowledgment bitmap of the one or more block acknowledgment bitmaps indicates an acknowledgment of a single data unit of the plurality of traffic data units having the corresponding traffic identifier value.

In other embodiments, the method includes any suitable combination of one or more of the following features.

In an embodiment, generating the acknowledgment data unit includes generating the first acknowledgment information field for the plurality of traffic data units to include (i) an identifier associated with the second communication device, (ii) a traffic identifier bitmap, and (iii) one or more block acknowledgment bitmaps, in an embodiment. Each bit of the traffic identifier bitmap corresponds to a respective traffic identifier value and indicates whether a respective block acknowledgment bitmap of the one or more block acknowledgment bitmaps is present within the first acknowledgment information field for the corresponding traffic identifier value, in an embodiment. Each bit of a block acknowledgment bitmap of the one or more block acknowledgment bitmaps indicates an acknowledgment of a single data unit of the plurality of traffic data units having the corresponding traffic identifier value, in an embodiment. The respective acknowledgment information fields include one or more of the BA information fields 420, 620, 720, 820, 920, 940, 1020, 1120, 1220, 1320, 1520, 1570, or 1620, in various embodiments and/or scenarios.

In an embodiment, the first acknowledgment information field includes respective block acknowledgment starting sequence control fields for the one or more block acknowledgment bitmaps that indicate a length of the corresponding block acknowledgment bitmap.

In an embodiment, each of the respective acknowledgment information fields includes (i) an identifier associated with the corresponding second communication device, and (ii) an acknowledgment indication that indicates whether a traffic identifier bitmap is present within the acknowledgment information field.

In an embodiment, a method for simultaneously communicating with multiple communication devices in a wireless local area network includes: receiving, at a first communication device, multiple uplink data units simultaneously transmitted by multiple second communication devices, wherein the multiple uplink data units include a plurality of traffic data units that is (i) from a second communication device of the multiple second communication devices, and (ii) includes traffic data units corresponding to multiple traffic identifier values; generating, at the first communication device, an acknowledgment data unit to acknowledge receipt of the multiple data units simultaneously transmitted by the multiple second communication devices, wherein the acknowledgment data unit includes (i) an indication that indicates that the acknowledgment data unit is intended for the multiple second communication devices, and (ii) respective acknowledgment information fields for the multiple second communication devices, wherein the respective acknowledgment information fields include a first acknowledgment information field for the plurality of traffic data units; and causing the acknowledgment data unit to be transmitted from the first communication device to the multiple second communication devices. Generating the acknowledgment data unit includes generating the first acknowledgment information field for the plurality of traffic data units to include, for each traffic identifier value of the multiple traffic identifier values to be acknowledged, (i) an identifier associated with the second communication device, (ii) an acknowledgment type indication, and (iii) the traffic identifier value to be acknowledged, the acknowledgment type indication has one or more bits set to one of a plurality of predetermined values including at least a first predetermined value and a second predetermined value, the first predetermined value indicates a normal acknowledgment of a single data unit for the corresponding traffic identifier value, and the second predetermined value indicates that a block acknowledgment bitmap follows the traffic identifier value to be acknowledged, where each bit of the block acknowledgment bitmap indicates an acknowledgment of a single data unit of the plurality of traffic data units having the corresponding traffic identifier value.

In an embodiment, a method for acknowledging data units in a wireless local area network includes: receiving, at a first communication device and from a second communication device, an aggregate medium access control (MAC) protocol data unit (MPDU) A-MPDU that includes multiple data units, wherein the multiple data units correspond to two or more traffic classes identified by different traffic identifiers; generating, at the first communication device, an acknowledgment data unit to acknowledge receipt of the multiple data units, wherein the acknowledgment data unit includes (i) an indication that indicates that the acknowledgment data unit is intended for the second communication device, and (ii) respective acknowledgment information fields for the two or more traffic classes; and causing the acknowledgment data unit to be transmitted from the first communication device to the second communication device.

In other embodiments, the method includes any suitable combination of one or more of the following features.

In an embodiment, receiving the A-MPDU includes receiving a single user physical layer protocol data unit (PPDU) that includes the A-MPDU and generating the acknowledgment data unit includes generating a single user PPDU that includes the acknowledgment data unit.

In an embodiment, the single user PPDU that includes the A-MPDU is an uplink PPDU and the single user PPDU that includes the acknowledgment data unit is a downlink PPDU; or the single user PPDU that includes the A-MPDU is a downlink PPDU and the single user PPDU that includes the acknowledgment data unit is an uplink PPDU.

In an embodiment, each of the respective acknowledgment information fields includes (i) a respective traffic identifier corresponding to data units of the multiple data units being acknowledged by the respective acknowledgment information field, and (ii) a respective acknowledgment type indication having one or more bits set to one of a plurality of predetermined values including at least a first predetermined value and a second predetermined value. The first predetermined value indicates that the acknowledgment data unit includes an acknowledgment that acknowledges a single data unit received from the second communication device and the second predetermined value indicates that the acknowledgment data unit includes a block acknowledgment that acknowledges multiple data units received from the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating an acknowledgment policy for a data unit in a wireless local area network, the method comprising:
generating, at a first communication device, a plurality of medium access control (MAC) protocol data units (MPDUs) of an aggregate MPDU intended for a second communication device, wherein the plurality of MPDUs includes i) a trigger frame, and ii) a non-trigger frame having an acknowledgment policy and corresponding to a single acknowledgment frame that acknowledges the non-trigger frame but does not include an identification of the non-trigger frame, and wherein the trigger frame includes an indication of radio resources allocated for the single acknowledgment frame to the non-trigger frame;
generating, at the first communication device, the aggregate MPDU to include the plurality of MPDUs; and
causing the aggregate MPDU to be transmitted from the first communication device to the second communication device; and
prior to generating the plurality of MPDUs, receiving an announcement indicating the second communication device supports an acknowledgement enabled single-traffic class aggregate MPDU and supports an acknowledgment enabled, multi-traffic class aggregate MPDU, wherein the plurality of MPDUs further includes a frame having a block acknowledgement policy and the plurality of MPDUs form an acknowledgment enabled, multi-traffic class aggregate MPDU.

2. The method of claim 1, wherein generating the aggregate MPDU comprises generating the aggregate MPDU to include the trigger frame as a first MPDU in the aggregate MPDU and the non-trigger frame as a second MPDU in the aggregate MPDU.

3. The method of claim 1, wherein the non-trigger frame is a management frame having the acknowledgment policy and corresponding to the single acknowledgment frame, wherein the single acknowledgment frame does not include an identification of the management frame.

4. The method of claim 3, wherein the management frame is an action frame having the acknowledgment policy and corresponding to the single acknowledgment frame, wherein the single acknowledgment frame does not include an identification of the action frame.

5. The method of claim 1, wherein the non-trigger frame is a single data frame having the acknowledgment policy and corresponding to the single acknowledgment frame, wherein the single acknowledgment frame does not include an identification of the single data frame.

6. The method of claim 1, further comprising:
receiving, from the second communication device, the single acknowledgment frame via the allocated radio resources.

7. The method of claim 1, wherein causing the aggregate MPDU to be transmitted from the first communication device to the second communication device comprises:
generating, at the first communication device, a multi-user downlink data unit that includes the aggregate MPDU; and causing the multi-user downlink data unit to be transmitted to a plurality of communication devices that includes the second communication device.

8. The method of claim 7, wherein the multi-user downlink data unit is an orthogonal frequency division multiple access (OFDMA) data unit.

9. The method of claim 7, wherein the multi-user downlink data unit is a multi-user multiple input, multiple output (MU-MIMO) data unit.

10. The method of claim 1, further comprising:
after causing the aggregate MPDU to be transmitted, receiving the single acknowledgement frame using the radio resources allocated for the single acknowledgment frame by the trigger frame,
wherein the plurality of MPDUs form an acknowledgement enabled, single traffic class aggregate MPDU.

11. The method of claim 4, wherein the action frame indicates a type of transmission of the single acknowledgement frame.

12. The method of claim 4, wherein the second communication device sends the single acknowledgement frame in response to the second communication device receiving the trigger frame and the non-trigger frame.

13. A method for acknowledging data units in a wireless local area network, the method comprising:
receiving, at a first communication device and from a second communication device, an aggregate medium access control (MAC) protocol data unit (A-MPDU) that includes multiple data units, wherein the multiple data units include i) a trigger frame, and ii) a non-trigger frame having an acknowledgment policy and corresponding to a single acknowledgment frame that acknowledges the non-trigger frame but does not include an identification of the non-trigger frame, wherein the trigger frame includes an indication of radio resources allocated for the single acknowledgment frame;
generating, at the first communication device, the single acknowledgment frame to acknowledge receipt of the non-trigger frame;
causing the single acknowledgment frame to be transmitted from the first communication device to the second communication device via the allocated radio resources; and
prior to receiving the A-MPDU, transmitting an announcement indicating the first communication device supports an acknowledgement enabled single-traffic class aggregate MPDU and supports an acknowledgment enabled, multi-traffic class aggregate MPDU,
wherein the A-MPDU further includes a frame having a block acknowledgement policy and the A-MPDU forms an acknowledgment enabled, multi-traffic class A-MPDU.

14. The method of claim 13, wherein:
receiving the A-MPDU comprises receiving a multi-user physical layer protocol data unit (PPDU) that includes the A-MPDU.

15. The method of claim 14, wherein the multi-user PPDU is an orthogonal frequency division multiple access (OFDMA) data unit.

16. The method of claim 14, wherein the multi-user PPDU is a multi-user multiple input, multiple output (MU-MIMO) data unit.

17. A wireless communication device, comprising:
a wireless network interface device associated with a first communication device, the wireless network interface device comprising one or more integrated circuit (IC) devices configured to:
generate a plurality of medium access control (MAC) protocol data units (MPDUs) of an aggregate MPDU intended for a second communication device, wherein the plurality of MPDUs includes i) a trigger frame, and ii) a non-trigger frame having an acknowledgment policy and corresponding to a single acknowledgment frame that acknowledges the non-trigger frame but does not include an identification of the non-trigger frame, and wherein the trigger frame includes an indication of radio resources allocated for the single acknowledgment frame to the non-trigger frame,
generate the aggregate MPDU to include the plurality of MPDUs;
control the wireless network interface device to transmit the aggregate MPDU to the second communication device; and
prior to generating the plurality of MPDUs, receive an announcement indicating the second communication device supports an acknowledgement enabled single-traffic class aggregate MPDU and supports an acknowledgment enabled, multi-traffic class aggregate MPDU,
wherein the plurality of MPDUs further includes a frame having a block acknowledgement policy and the plurality of MPDUs form an acknowledgment enabled, multi-traffic class aggregate MPDU.

18. The wireless communication device of claim 17, wherein the one or more IC devices are further configured to generate the aggregate MPDU to include the trigger frame as a first MPDU in the aggregate MPDU and the non-trigger frame as a second MPDU in the aggregate MPDU.

19. The wireless communication device of claim 17, wherein the non-trigger frame is a management frame having the acknowledgment policy and corresponding to the single acknowledgment frame, wherein the single acknowledgment frame does not include an identification of the management frame.

20. The wireless communication device of claim 19, wherein the management frame is an action frame having the acknowledgment policy and corresponding to the single acknowledgment frame, wherein the single acknowledgment frame does not include an identification of the action frame.

21. The wireless communication device of claim 17, wherein the non-trigger frame is a single data frame having the acknowledgment policy and corresponding to the single acknowledgment frame, wherein the single acknowledgment frame does not include an identification of the single data frame.

22. The wireless communication device of claim 17, wherein the one or more IC devices are further configured to:
receive, from the second communication device, the single acknowledgment frame via the allocated radio resources.

23. The wireless communication device of claim 17, wherein the one or more IC devices are further configured to:
generate a multi-user downlink data unit that includes the aggregate MPDU; and
control the wireless network interface device to transmit the multi-user downlink data unit to a plurality of communication devices that includes the second communication device.

24. A wireless communication device, comprising:

a wireless network interface device associated with a first communication device, the wireless network interface device comprising one or more integrated circuit (IC) devices configured to:

receive, from a second communication device, an aggregate medium access control (MAC) protocol data unit (A-MPDU) that includes multiple data units, wherein the multiple data units include i) a trigger frame, and ii) a non-trigger frame having an acknowledgment policy and corresponding to a single acknowledgment frame that acknowledges the non-trigger frame but does not include an identification of the non-trigger frame, wherein the trigger frame includes an indication of radio resources allocated for the single acknowledgment frame, generate the single acknowledgment frame to acknowledge receipt of the non-trigger frame, control the wireless network interface device to transmit the single acknowledgment frame to the second communication device via the allocated radio resources; and prior to receiving the A-MPDU, transmit an announcement indicating the first communication device supports an acknowledgement enabled single-traffic class A-MPDU and supports an acknowledgment enabled, multi-traffic class A-MPDU, wherein the plurality of MPDUs further includes a frame having a block acknowledgement policy and the plurality of MPDUs form an acknowledgment enabled, multi-traffic class A-MPDU.

25. The wireless communication device of claim 24, wherein the one or more IC devices are configured to:

receive the A-MPDU within a multi-user physical layer protocol data unit (PPDU).

* * * * *